US012123581B2

(12) United States Patent
Sharrah et al.

(10) Patent No.: US 12,123,581 B2
(45) Date of Patent: Oct. 22, 2024

(54) PORTABLE LIGHT HAVING CHANGEABLE ACTUATORS

(71) Applicant: STREAMLIGHT, INC., Eagleville, PA (US)

(72) Inventors: Raymond L. Sharrah, Collegeville, PA (US); William D. Worman, Phoenixville, PA (US)

(73) Assignee: Streamlight, Inc., Eagleville, PA (US)

( * ) Notice: Subject to any disclaimer, the term of this patent is extended or adjusted under 35 U.S.C. 154(b) by 0 days.

(21) Appl. No.: 18/096,350

(22) Filed: Jan. 12, 2023

(65) Prior Publication Data

US 2023/0235877 A1 Jul. 27, 2023

Related U.S. Application Data

(60) Provisional application No. 63/299,699, filed on Jan. 14, 2022.

(51) Int. Cl.

*F21V 23/04* (2006.01)
*F21L 4/00* (2006.01)
*F41G 1/35* (2006.01)

(52) U.S. Cl.

CPC .............. *F21V 23/04* (2013.01); *F21L 4/005* (2013.01); *F21V 23/0414* (2013.01); *F41G 1/35* (2013.01)

(58) Field of Classification Search

CPC ...... F21L 4/005; F21V 23/04; F21V 23/0414; F41G 1/35

See application file for complete search history.

(56) References Cited

U.S. PATENT DOCUMENTS 6,148,483 A 11/2000 DeGraff
6,609,810 B2 * 8/2003 Kim .......................... F41G 1/35 439/378

(Continued)

FOREIGN PATENT DOCUMENTS

KR 301128799.0000 9/2021
KR 301136456.0000 11/2021
WO 2021/144428 7/2021

OTHER PUBLICATIONS

International Searching Authority, "PCT—International Search Report & Written Opinion", PCT/US2023/10779, mailed May 10, 2023, 14 pages.

(Continued)

*Primary Examiner* — William N Harris

(74) *Attorney, Agent, or Firm* — Clement A. Berard, Esq.; Dann, Dorfman, Herrell & Skillman, PC

(57) ABSTRACT

A portable light may comprise: a light body; a light source, an electrical switch for selectively energizing the light source, the light body having an opening through which the electrical switch can be actuated. A pivot pin pivotably mounts an actuator having an actuation feature that extends towards the opening for actuating the electrical switch when pivoted towards the light body. The light body has a receptacle in which the pivot pin is removably disposed. A retainer of a resilient material resiliently retains the pivot pin in the receptacle and resiliently deforms for removal of the pivot pin therefrom; whereby the actuator is removable and replaceable on the light body by removing the pivot pin. The light body may have a seal of resilient material in the opening of the light body. A user formable actuator of a curable material may be provided.

33 Claims, 13 Drawing Sheets

(56) References Cited

U.S. PATENT DOCUMENTS

| | | | |
|---|---|---|---|
| D542,446 S | 5/2007 | DiCarlo | |
| D738,455 S | 9/2015 | Homem de Mello Anderson | |
| 9,488,439 B2 | 11/2016 | Galli et al. | |
| 9,810,411 B2 | 11/2017 | Galli et al. | |
| D812,178 S | 3/2018 | Galli | |
| 9,958,143 B2 | 5/2018 | Galli et al. | |
| 10,344,959 B2 | 7/2019 | Worman et al. | |
| 10,612,761 B1 | 4/2020 | Worman et al. | |
| 10,697,623 B2 | 6/2020 | Worman et al. | |
| D907,270 S | 1/2021 | Worman | |
| 10,928,051 B1 | 2/2021 | Worman | |
| 11,112,210 B2 | 9/2021 | Brown | |
| 11,162,665 B2 | 11/2021 | Worman | |
| D997,413 S | 8/2023 | Sharrah | |
| 2001/0033486 A1 | 10/2001 | Maine | |
| 2010/0176741 A1* | 7/2010 | Sharrah | F21V 21/0885 362/382 |
| 2017/0268849 A1 | 9/2017 | Conner | |
| 2018/0094900 A1 | 4/2018 | Sharrah | |
| 2018/0283670 A1 | 10/2018 | Galli | |
| 2019/0154243 A1 | 5/2019 | Worman et al. | |
| 2019/0301835 A1* | 10/2019 | Tayon | F41G 1/35 |
| 2020/0158473 A1 | 5/2020 | Surefire | |
| 2021/0080222 A1* | 3/2021 | Brown | F41C 23/18 |
| 2022/0003393 A1* | 1/2022 | Starr | F21V 23/04 |
| 2022/0042675 A1 | 2/2022 | Sharrah | |

OTHER PUBLICATIONS

Bayco Products, Inc. "Nighstick TCM-550XL Compact Tactical Weapon-Mounted Light", © 2020, 3 pages, https://www.baycoproducts.com/product/weapon-mounted-lights/item/tcm-550xl.

Bayco Products, Inc. "Nighstick TCM-550XL Instruction Manual", undated, 3 pages, www.nightstick.com.

Nitecore, "P05 Pink", © 2012-2017, 20 pages, https://flashlight.nitecore.com/product/p05pink.

Nitecore, "P05 User Manual", undated, 1 pages, https://flashlight.nitecore.com/product/p05pink.

Streamlight, Inc., "Mountable Light", Design U.S. Appl. No. 29/699,103, filed Jul. 23, 2019, 22 pages.

Streamlight, Inc., "Mountable Light", Design U.S. Appl. No. 29/699,109, filed Jul. 23, 2019, 22 pages.

Streamlight, Inc., "Mountable Light", Design U.S. Appl. No. 29/699,113, filed Jul. 23, 2019, 22 pages.

Streamlight, Inc., "Mountable Light", Design U.S. Appl. No. 29/699,118, filed Jul. 23, 2019, 22 pages.

Streamlight, Inc., "Mountable Light", Design U.S. Appl. No. 29/711,469, filed Oct. 31, 2019, 32 pages.

Streamlight, Inc., European Union Intellectual Property Office, Registered Community Design No. 007020706-0001, Registered Oct. 14, 2019, 7 pages.

Streamlight, Inc., European Union Intellectual Property Office, Registered Community Design No. 007020706-0002, Registered Oct. 14, 2019, 7 pages.

Streamlight, Inc., European Union Intellectual Property Office, Registered Community Design No. 007020706-0003, Registered Oct. 14, 2019, 7 pages.

Streamlight, Inc., European Union Intellectual Property Office, Registered Community Design No. 007020706-0004, Registered Oct. 14, 2019, 7 pages.

Streamlight, Inc., European Union Intellectual Property Office, Registered Community Design No. 007833462-0001, Registered Apr. 23, 2020, 4 pages.

Streamlight, Inc., European Union Intellectual Property Office, Registered Community Design No. 007833462-0002, Registered Apr. 23, 2020, 4 pages.

"Streamlight 69424 TLR-7A", available in Amazon.com, first available online Feb. 14, 2020, site visited Nov. 14, 2023, Internet URL: https: //www.amazon.com/dp/B084SWJQG6?ref=cm_sw_r_cp_ud_dp_81 STV95VYXHZ6YSP3515&th=1 (Year: 2020).

"Streamlight 69434 TLR-8A", available in Amazon.com, first available online Feb. 14, 2020, site visited, Nov. 4, 2023 Internet URL: https://www.amazon.com/dp/B084SVFWH2?ref_= cm_sw_r cp_ud_dp_52B 1 A04HCHJ RY530A56Q (Year: 2020).

U.S.P.T.O. Office Action, U.S. Appl. No. 29/823,208, filed Jan. 14, 2022, "Cover for a Light or Similar Article" Mailed: Feb. 9, 2024. 17 pages.

Streamlight, Inc., "Declaration of Raymond L. Sharrah Under 37 C.F.R. §1.132", dated Apr. 18, 2024, 10 pages. Declaration was filed in U.S. Appl. No. 29/823,208.

* cited by examiner

PORTABLE LIGHT HAVING CHANGEABLE ACTUATORS

This Application claims the priority and the benefit of U.S. Provisional Patent Application No. 63/299,699 entitled "PORTABLE LIGHT HAVING CHANGEABLE ACTUATORS" filed on Jan. 14, 2022, which is hereby incorporated herein by reference in its entirety.

The present invention relates to a portable light and, in particular, to a portable light suitable for having changeable actuators.

Everyone has their own favorite. And that is true of users of portable lights just as it is for users of other articles. Some users of portable lights prefer a push button actuator, some prefer a slide actuator and others prefer a contoured actuator. Where a portable light is mountable to an object, users often prefer an actuator that they find comfortable and easy to use when gripping the object in a particular, common way.

Where the object to which a light is mountable is, e.g., a firearm, most users prefer a light that is actuatable by a forefinger or index finger of the hand that grips the firearm in the vicinity of its trigger, e.g., from a firing grip, or by the thumb of the other hand used to steady the firearm. However, within that group are those who prefer an actuator that responds to being pressed or moved upward or downward while others prefer an actuator that responds to being pressed inwardly from the side, e.g., based upon their particular anatomy and simply upon subjective preference, and others may prefer an actuator that could be pushed forwardly.

Further, within each group of users are those who prefer the actuator to be higher, e.g., closer to the barrel of the firearm, and those who prefer it be lower, e.g., further away from the barrel. In addition, the particular shape of the actuator is also subject to personal likes and dislikes. Other users might prefer differently shaped actuators when using a light on different objects, e.g., different firearms.

The result of such individuality and preferences has been a proliferation of different portable lights that have different actuator configurations each designed to fit, e.g., the preferences of what the manufacturer deems to be the predominant preference at any given time.

In one example, a pair of pivoted actuators is provided at the rear of the light to actuate an internal switch when pressed downward, e.g., away from the mount by which the light is mounted on a firearm. The actuator pivots are centered vertically with one actuator located towards the left side of the light and the other actuator located towards the right side. Actuation requires a downward force applied at a ledge of the actuator. The actuator is in a fixed central location vertically which may not be preferred by many users, and does not operate when pressed forwardly, i.e. toward the body of the light.

One approach taken to avoid the foregoing limitations is to provide interchangeable covers, e.g., rear covers often called tail caps, that support actuators having different configurations. Such interchangeable covers or tail caps can be interchanged on a light, e.g., by disassembling the light to remove one tail cap and then reassembling the light using a different tail cap, i.e. a tail cap having actuators of a different configuration. Usually such disassembly and reassembly requires a tool, e.g., a hexagonal "Allen" wrench or Philips head screwdriver, to remove and to reinstall fasteners that retain the tail cap to the light. Often the right tool may be misplaced or otherwise unavailable. In addition, the fasteners are typically relatively small and so may be misplaced when removed from the light.

U.S. Pat. No. 11,162,665 issued Nov. 2, 2021 entitled "MOUNTABLE LIGHT HAVING AN INTERCHANGEABLE TAIL CAP," which is assigned to the Applicant in this Application, describes such interchangeable covers or tail caps.

These and other fixed actuator variations have resulted in a great variety of different portable lights having different configurations and different actuators. Users thereof who otherwise might share a portable light among different firearms and/or with others may have to choose either to procure an additional light of their own that comes closer to their preferences or to put up with a shared light that is not to their liking.

Applicant believes there may be a need for a portable light configured such that the actuator or actuators thereof can easily and conveniently be changed and/or interchanged to suit one or more users and/or different firearms without disassembling the light. It would be desirable, but not necessary, that such actuator arrangement be operative not only when pressed in a vertical direction, but also when pressed forwardly toward the body of the light.

Accordingly, a portable light may comprise: a light body having a cavity for a source of electrical power, a light head including a light source, an electrical switch therein for selectively energizing the light source for producing light, and wherein the light body has an opening through which the electrical switch can be actuated from outside of the light body; a pivotable mounting for mounting at least one actuator to the exterior of the light body, the at least one actuator having an actuation feature that is spaced apart from the pivotable mounting and that extends towards the opening of the light body for actuating the electrical switch when the at least one actuator is pivoted towards the light body; the pivotable mounting including a pivot pin on which the at least one actuator is pivotable; the light body having a receptacle in which the pivot pin is removably disposed; a retainer of a resilient material configured to resiliently retain the pivot pin in the receptacle of the light body and to resiliently deform for removal of the pivot pin therefrom; whereby the at least one actuator is removable and replaceable on the light body by removing the pivot pin. The light body may have a seal of resilient material in the opening of the light body.

In addition, a portable light may comprise: a light body having a cavity for a source of electrical power, a light head including a light source, wherein the light body includes a pair of electrical switches therein each for selectively energizing the light source of the light head for producing light, and wherein the light body includes a tail cap having a pair of openings through which the pair of electrical switches can be actuated from outside of the light body; a pivotable mounting for mounting a pair of actuators to the exterior surface of the tail cap, the pair of actuators being side by side and spaced apart from each other, wherein each actuator has an actuation feature that is spaced apart from the pivotable mounting and that extends towards a respective opening of the tail cap for actuating the respective electrical switch when each actuator is pivoted towards the tail cap of the light body; the pivotable mounting including a pivot pin on which the pair of actuators are pivotable; the tail cap having a receptacle in which the pivot pin is removably disposed; a retainer of a resilient material configured to resiliently retain the pivot pin in the receptacle of the tail cap and to resiliently deform for removal of the pivot pin therefrom; whereby the actuators are removable and replaceable on the light body by removing the pivot pin. The tail cap may have a seal of the resilient material disposed in the respective openings of the tail cap adjacent the respective actuation features of the pair of actuators.

Further, a user formable actuator for a light may comprise: an actuator base member of a rigid material defining an opening for receiving a pivot pin and defining an actuation feature, wherein the opening and the actuation feature are located on a first side of the actuator base member adjacent the light body; and a formable member disposed on a second side the actuator base member that is opposite to the first side thereof, the formable member being of a formable material having a shape that can be formed to define an actuation surface having a user defined shape; and wherein the formable material of the formable member is curable on the actuator base member to retain the user defined shape.

In summarizing the arrangements described and/or claimed herein, a selection of concepts and/or elements and/or steps that are described in the detailed description herein may be made or simplified. Any summary is not intended to identify key features, elements and/or steps, or essential features, elements and/or steps, relating to the claimed subject matter, and so are not intended to be limiting and should not be construed to be limiting of or defining of the scope and breadth of the claimed subject matter.

BRIEF DESCRIPTION OF THE DRAWING

The detailed description of the preferred embodiment(s) will be more easily and better understood when read in conjunction with the FIGURES of the Drawing which include.

Figure 1:
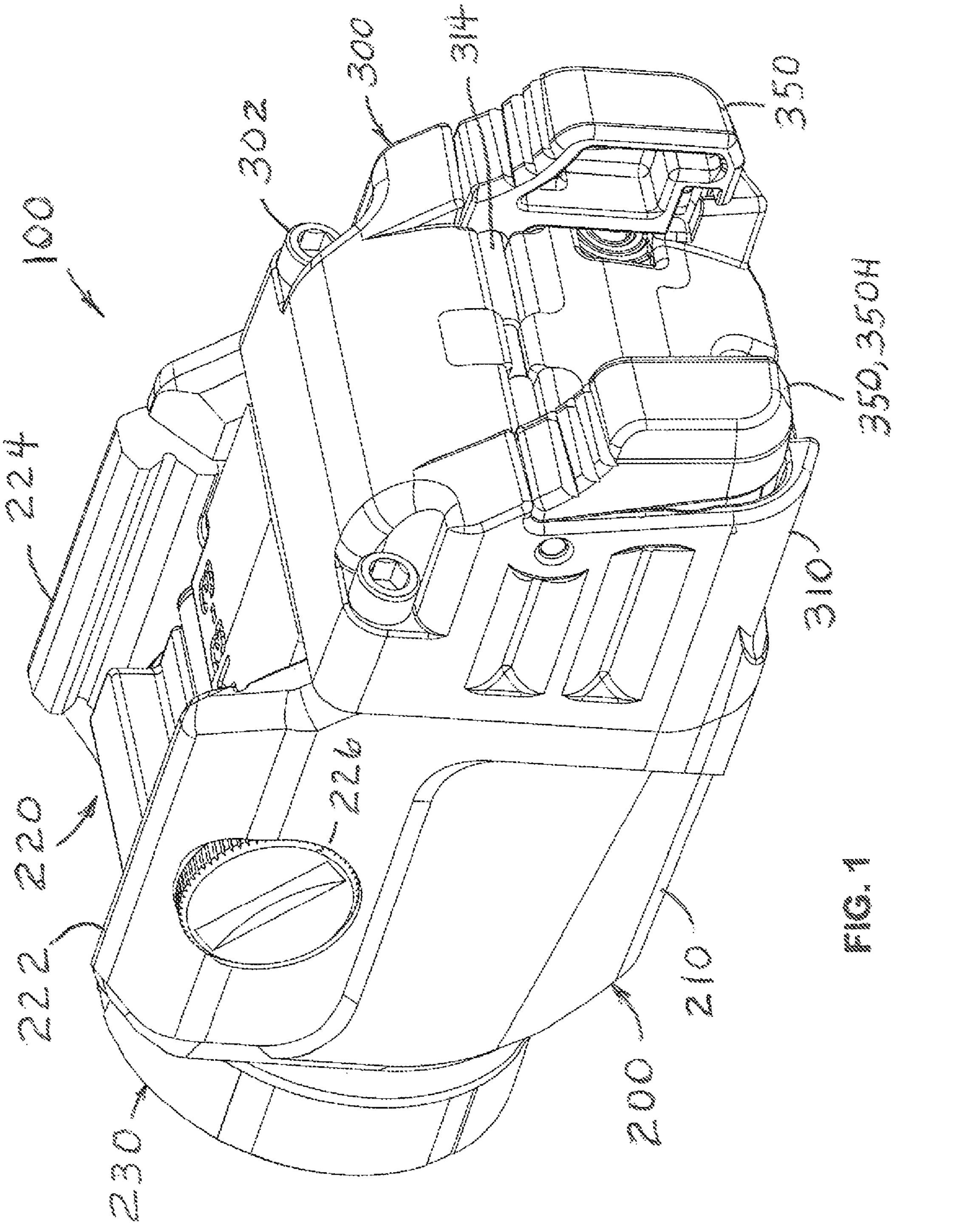
FIG. 1 is a perspective view of a first example embodiment of a portable light having one or more actuators of a first type thereon.

In the Drawing, where an element or feature is shown in more than one drawing figure, the same alphanumeric designation may be used to designate such element or feature in each figure, and where a closely related or modified element is shown in a figure, the same alphanumerical designation may be primed or designated "a" or "b" or the like to designate the modified element or feature. Similar elements or features may be designated by like alphanumeric designations in different figures of the Drawing and with similar nomenclature in the specification. As is common, the various features of the drawing are not to scale, the dimensions of the various features may be arbitrarily expanded or reduced for clarity, and any value stated in any Figure is by way of example only.

DESCRIPTION OF THE PREFERRED EMBODIMENT(S)

Figure 1A:
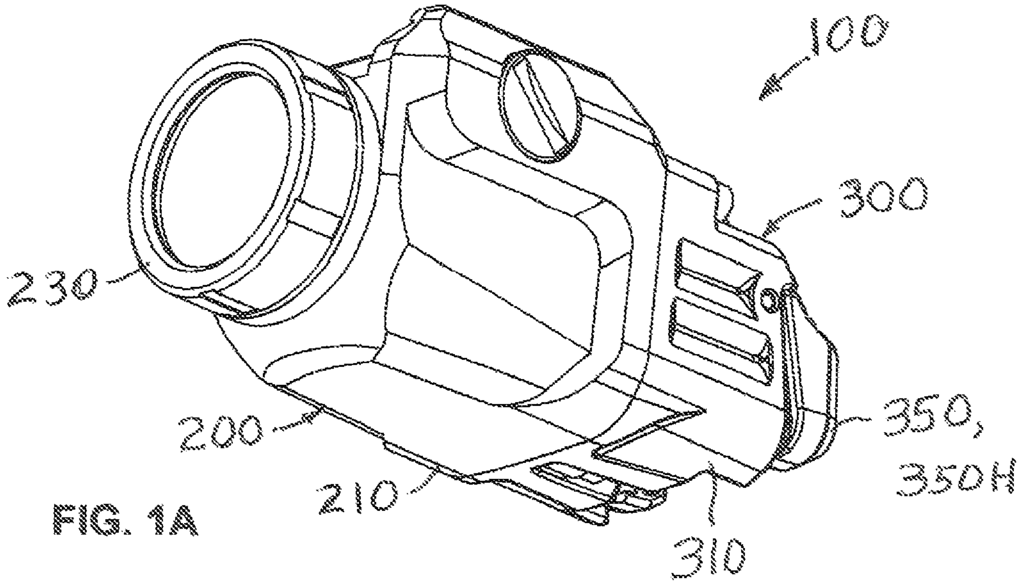
FIGS. 1A and 1B are additional perspective views thereof.
Figure 1B:
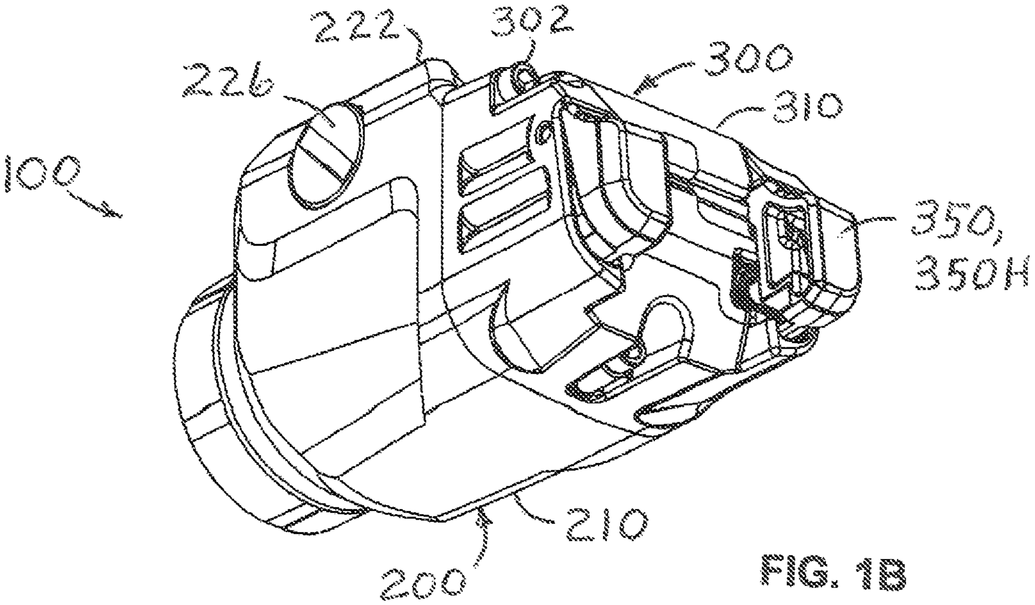
Figure 2A:
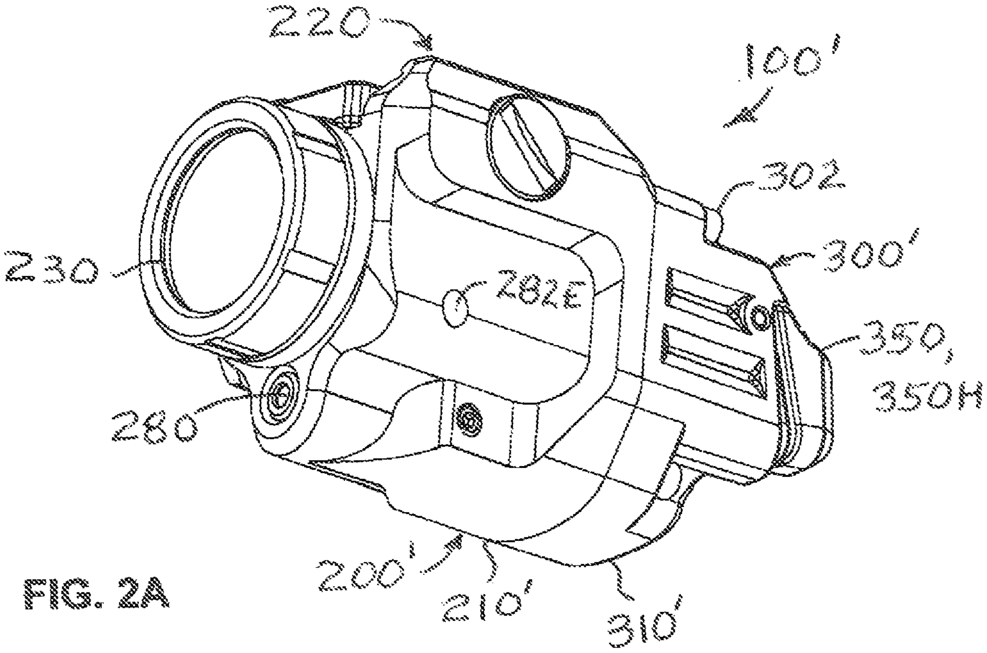
FIGS. 2A and 2B are perspective views of a second example embodiment of a portable light having one or more actuators of the first type thereon.
Figure 2B:
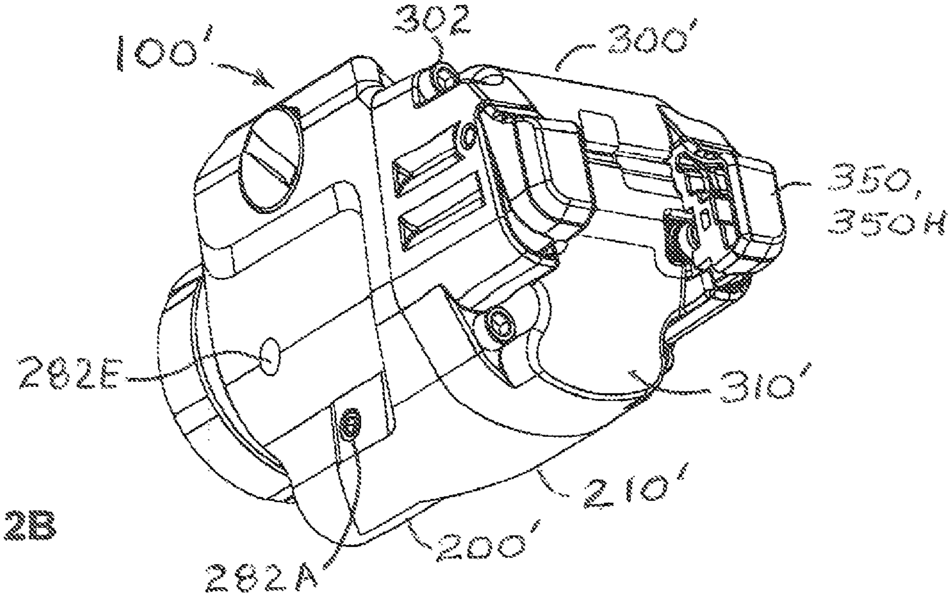

FIG. 1 is a perspective view of a first example embodiment of a portable light having one or more actuators of a first type thereon, and FIGS. 1A and 1B are additional perspective views thereof; and FIGS. 2A and 2B are perspective views of a second example embodiment of a portable light 100' having one or more actuators 350 of the first type 350H thereon. Actuators 350 may be of different types, e.g., have different shapes of the actuation feature thereof while having the same configuration for interfacing with lights 100, 100', so that may replace each other, i.e. be interchangeable, on different lights 100, 100'.

Portable light 100, 100' includes a light body 200, 200' including a body housing 210, 210', a clamping arrangement 220 for attaching (mounting) the light 100, 100' to an object, e.g., a firearm, a light head 230 for producing light and projecting the light in a generally forward direction, and a cover or tail cap assembly 300, 300'.

In a typical usage, light 100, 100' is mounted to a firearm beneath the barrel thereof and forwardly adjacent to the trigger guard thereof, and so the terms "top" and "upper side" are generally used to refer to the side of light 100, 100' having mounting 220, the "front" is generally the end of light 100, 100' having light head 230 and the rear is the end of light 100, 100' having actuators 350. However, other uses and mountings are contemplated.

Body housing 210, 210' supports clamping arrangement 220 which in one example embodiment includes a fixed clamp member 222, a movable clamp member 224 and a clamp mechanism 226, e.g., clamp screw 226, that tightens clamp members 222, 224 to fasten light 100, 100' to an object, e.g., a firearm, and loosens clamp members 222, 224 to release light 100, 100' from the object. Any suitable clamping or other attaching arrangement 220 may be employed.

Light head 230 is mounted at the forward end of the light 100, 100' and includes a light source so as to direct light forwardly when energized. Body housing 210, 210' typically includes a cavity for receiving a source of electrical power, e.g., one or more batteries, for providing electrical power to a light source of light head 230 and control circuitry for selectively energizing the light source. Typically, light head 230 screws into a threaded opening at the forward end of body housing 210, 210' through which the source of electrical power may be installed into and removed from the cavity internal to body housing 210, 210'.

Tail cap assembly 300, 300', which is often referred to simply as tail cap 300, 300', includes a tail cap housing 310, 310' that is attached to the rearward end of body housing 210, 210', e.g., by one or more fasteners 302. Tail cap housing 310, 310' includes one or more actuators 350 on the rearward part thereof that may be moved by a user for energizing and de-energizing the light source of light head 230, e.g., by actuating one or more electrical switches disposed within light body 200, 200', e.g., internally proximate the rear portion of tail cap 300, 300'.

While the example light bodies 200, 200' described herein include, e.g., a cover or tail cap 300, 300' that may be (but need not be) a separate part or assembly from the remainder of the light body 200, 200', such cover or tail cap 300, 300' is not necessary to the arrangement described and claimed herein. Interchangeable actuators 350, 350H, 350L and the like, employing the arrangement described herein may be employed with and on a light body that does not have a separable part on which the actuators are mounted. It is further noted that the arrangement described herein advantageously enables the changing of actuators 350, 350H, 350L and the like, without removing part of the light body housing and without access to the interior of the light.

In a typical light 100, 100', pressing either actuator 350 for a short time, e.g., less than about 0.25 second, causes the light source of light head 230 to turn ON if OFF and pressing either actuator 350 for a second short time causes light head to turn OFF, in a toggling back and forth manner alternating between ON and OFF. Pressing either actuator 350 for a relatively longer time, e.g., more than about 0.25 second, when light 100, 100' is OFF causes the light source of light head 230 to turn ON for as long as actuator 350 is held in the pressed position.

As will become more evident from further description below, tail cap 300, 300' preferably has a pivot located on the rearward side thereof on which actuator 350 pivots. Actuator 350 has an actuating feature 354 that is located near the rearward side of tail cap 300, 300' and that is movable inwardly and outwardly, e.g., towards and away from, an opening in tail cap 300, 300' so as to directly or indirectly actuate an electrical switch disposed within light body 200, 200'. While the location of that pivot and/or the configuration of the actuator may vary widely while embodying the novel arrangement described herein, in the preferred example arrangement described herein the pivot is located in a particular region of the rear of the light and the actuator is configured to pivot and have an actuation feature in particular relative locations thereon.

Actuator 350 is shaped to include a surface extending in a rearward direction to provide a ledge or actuator surface against which a user presses a finger to actuate the electrical switch interior the light 100, 100'. Because of the respective locations of the pivot and the actuating feature relative to tail cap 300, 300', e.g., the pivot being above the centerline of light 100, 100' and the actuating feature below the centerline, actuator 350 will actuate the internal electrical switch when pressed in a wide variety of directions, including at least a downward direction and a forward direction and any direction therebetween.

In the light 100, 100' embodiment, tail cap 300, 300' may include actuators 350, 350H of a first example type that have actuator surfaces that are in a high, or HI, position, e.g., above the actuating feature, and generally proximal to the pivot pin or hinge pin on which actuator 350 pivots, that may be interchanged with actuators 350, 350L of a second example type that have actuator surfaces that are in a low, or LO, position, e.g., below the actuating feature, and generally distal from the pivot pin or hinge pin on which actuator 350 pivots.

Alternative actuators 350 may be shaped to have any suitable actuator surface that may be desired, e.g., a shape having an actuator surface that is above, or below or at the same vertical location as the opening through the rear of tail cap 300, 300', as may be desirable or convenient to the preferences of the manufacturer and/or of a user.

Tail cap 300, 300' can remain on light body 200, 200' of light 100, 100' on which actuators 350 are interchangeable without tail cap 300, 300' being removed from light 100, 100' irrespective of which actuator 350, 350H, 350L, or an actuator 350 having a shape other than an illustrated shape, is to be provided thereon. The periphery of the forward end of the tail cap housings 310, 310' for various light bodies 200, 200' and the locations and positions of the openings therein may be configured so that tail cap housings 310, 310' will fit properly adjacent to the rearward end of body housing 210, 210' with the openings proximate the internal electrical switches therein, without affecting the operation of the actuators thereof. The internal structure of body housing 210, 210' and parts thereof internal to light 100, 100' are preferably the same and are fixed in predetermined positions for providing tail caps 300, 300' for various lights 100, 100' while maintaining interchangeability of actuators 350 of various configurations.

Advantageously, the configuration of actuator 350, including various high and low actuator variations referred to as actuators 350H, 350L not only allows the actuator to be arranged in many different configurations that may be desirable to many different user preferences, it also further accommodates user preferences and differences by being actuatable by being pressed over a wide range of directions from at least downward vertically to forward horizontally. As a result, the present arrangement is thought to accommodate a wider range of users including those who prefer to use a finger of their firing hand to actuate their gun-mounted light and those who prefer to use the thumb of their support hand to actuate the light.

Light 100' differs from light 100 in that light body 200' includes a secondary light source 280 that directs secondary light in a generally forward direction, e.g., in substantially the same direction as illumination light from light head 230. Secondary light source 280 may be disposed in light body 200', e.g., above or below or to the right or the left of light head 230, or may be disposed therein.

Secondary light source 280 may be, e.g., an infrared (IR) light source providing IR illumination as is useful with night vision equipment, or may be, e.g., a laser light source providing a laser light beam useful for aiming the firearm onto which light 100' is mounted to be directed to an intended target. The aiming laser light may be visible light, e.g., red or green laser light, or not visible light, e.g., IR laser light.

Light body housing 210' and tail cap housing 310' differ from light body housing 210 and tail cap housing 310 in that their shapes are slightly different to accommodate light source 280 disposed in body housing 210' and to mate with each other. Body housing 210' typically has openings 282A and 282E for accessing threaded members that are rotated to adjust the azimuth and elevation, respectively, of light source 280. Tail caps 300 and 300' also differ in that the former is retained to the light body 200 by, e.g., three fasteners 302, whereas the latter is retained to light body 200' by four fasteners 302. Otherwise, the descriptions herein relative to light 100 and the various parts, aspects and operation thereof also describe light 100' and the various parts, aspects and operation thereof.

Actuators 350, 350H, 350L are employed in light 100 for controlling the light source of light head 230. Actuators 350, 350H, 350L are employed in light 100' for controlling both the light source of light head 230 and light source 280. Operating modes that may be selectable may include, e.g., illumination light only, secondary light only, and both illumination and secondary light together.

Examples of light body housings 210, 210', of example light heads 230 and of example tail caps 300, 300' suitable for example lights 100, 100' may be found, e.g., in U.S. Pat. No. 10,344,959 entitled "PORTABLE AND/OR MOUNTABLE LIGHT" and/or in U.S. Pat. No. 11,162,665 entitled "MOUNTABLE LIGHT HAVING AN INTERCHANGE- ABLE TAIL CAP," both of which are assigned to Streamlight, Inc. and both of which are hereby incorporated herein by reference in their entireties.

Figure 3:
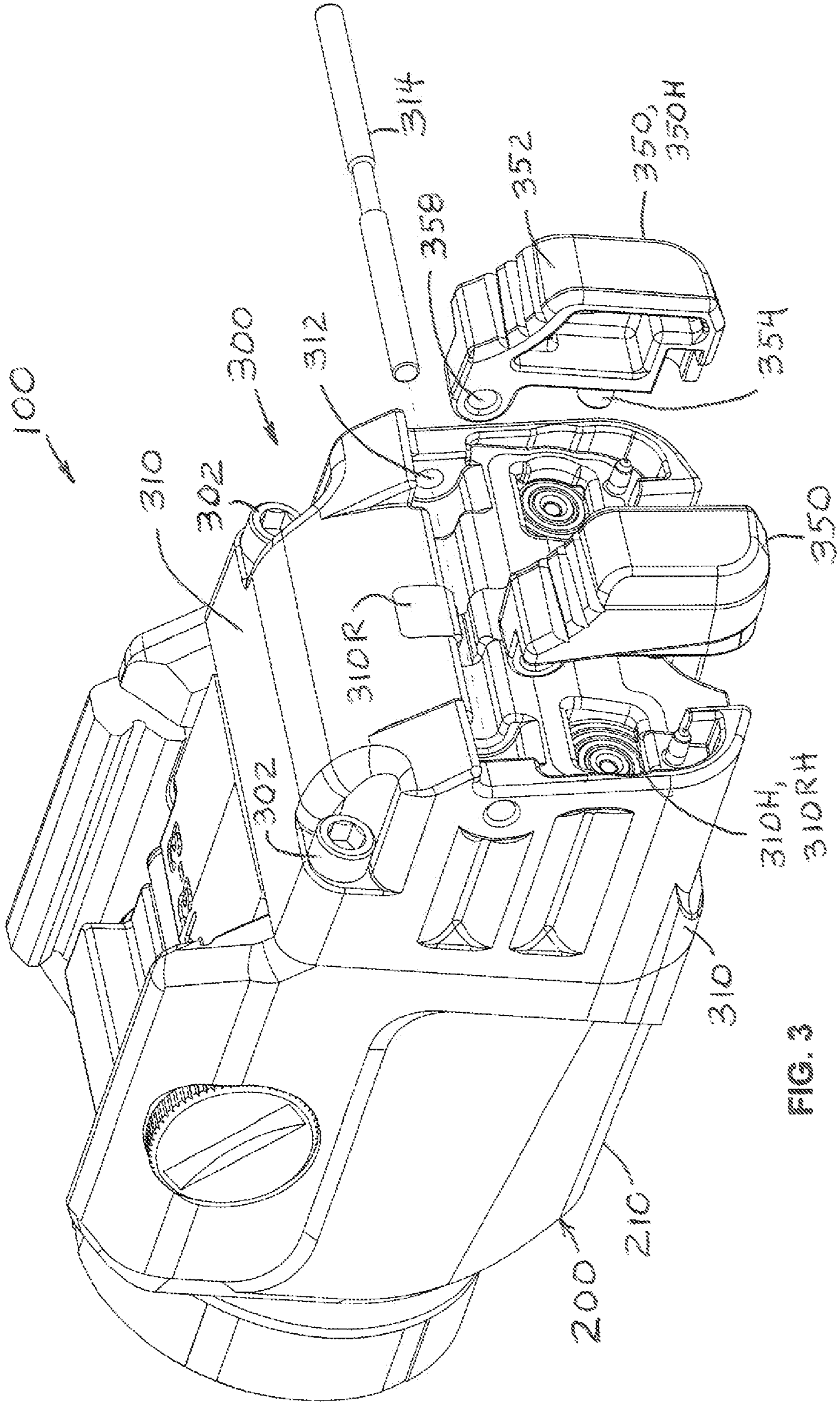
FIG. 3 is a partially exploded view of the first example light having an example cover or tail cap with the example actuator of the first type.
Figure 4A:
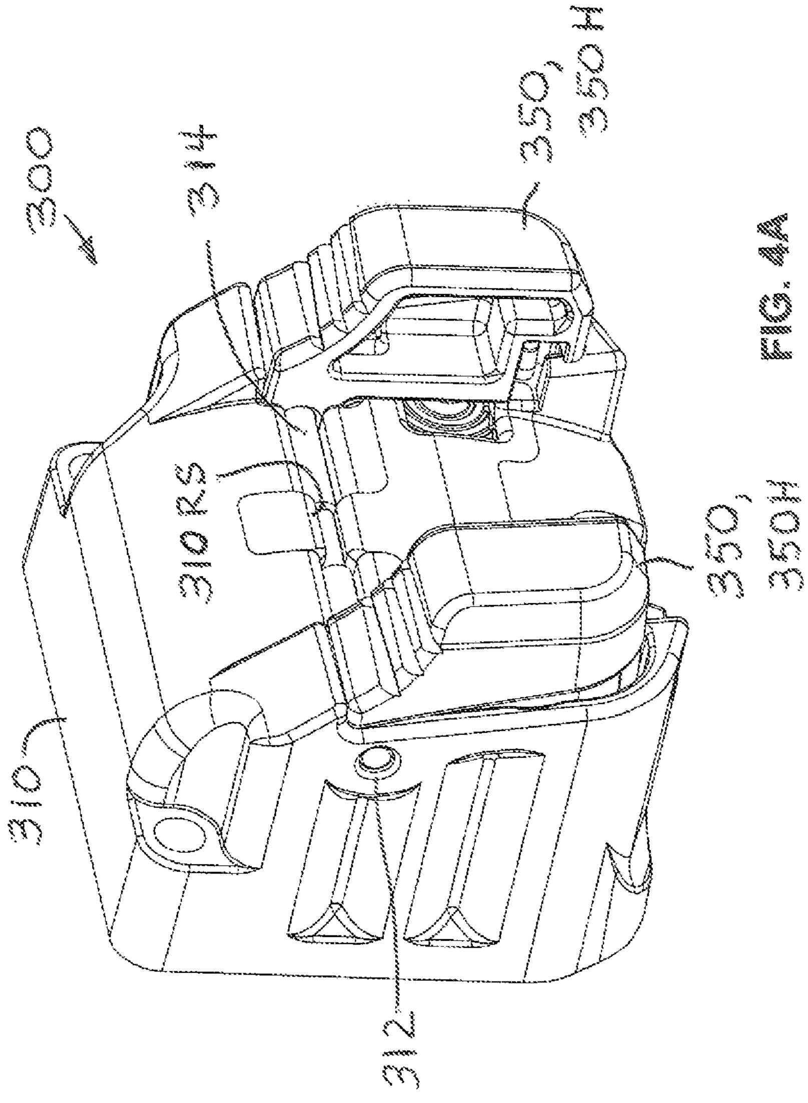
FIGS. 4A and 4B are perspective and exploded views, respectively, of the example cover or tail cap having the example actuator of the first type.
Figure 4B:
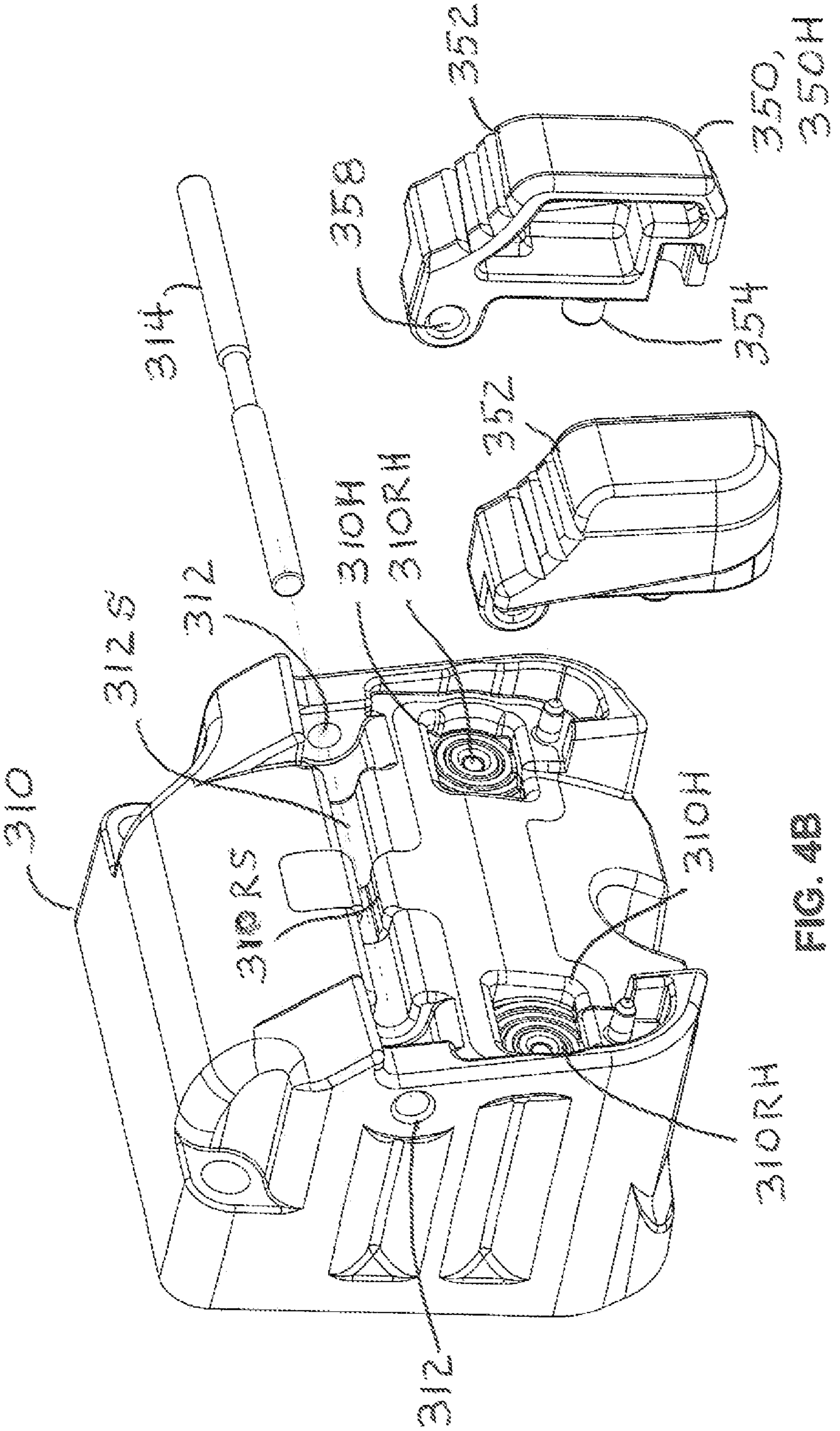
Figure 5A:
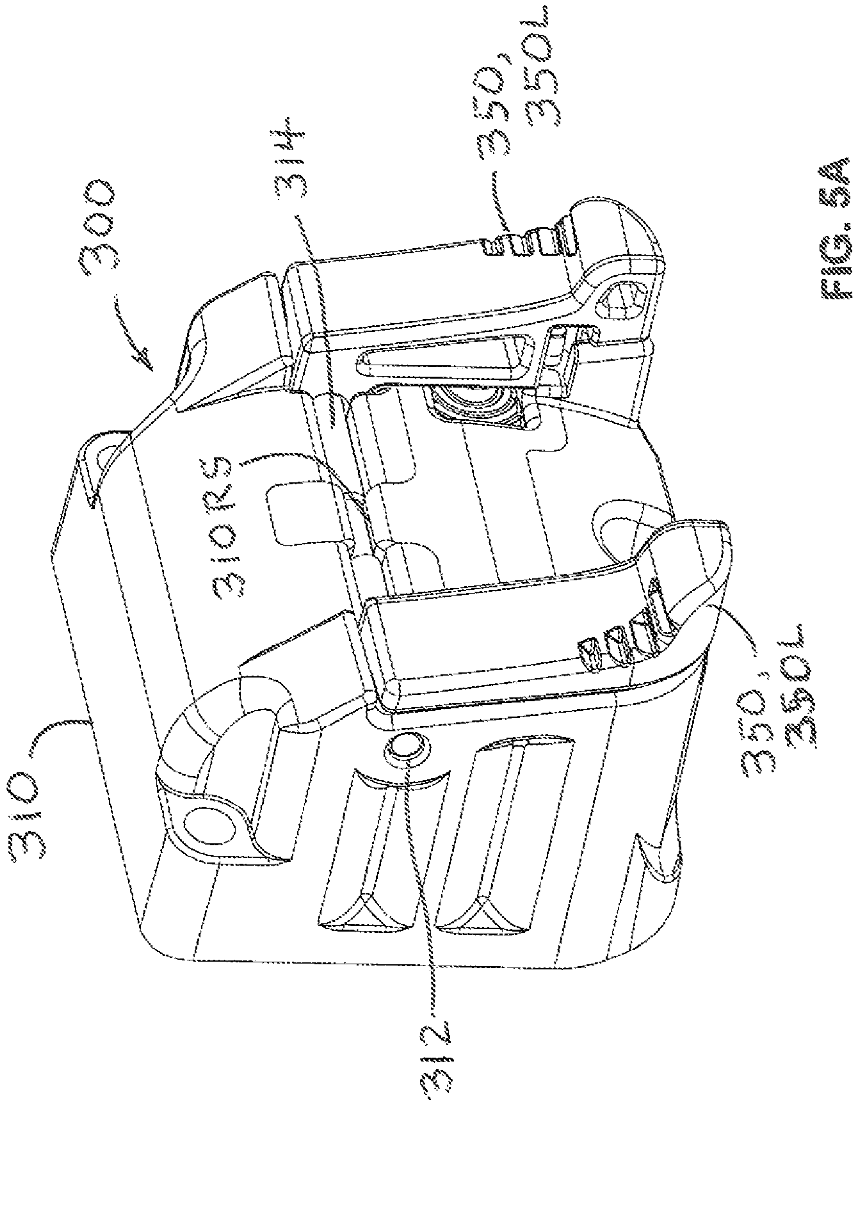
FIGS. 5A and 5B are perspective and exploded views, respectively, of the example cover or tail cap having the example actuator of the second type.
Figure 5B:
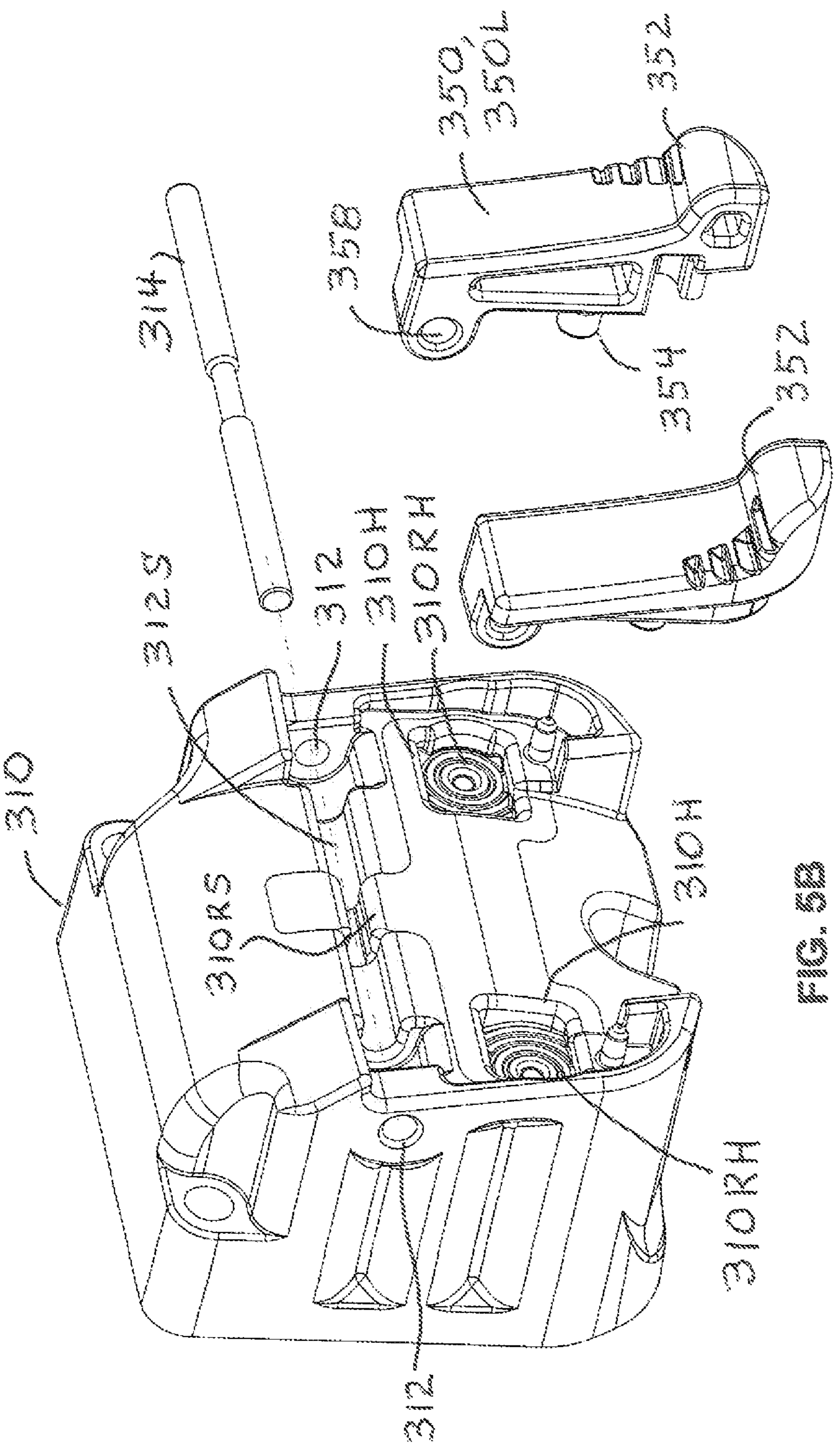

FIG. 3 is a partially exploded view of the first example light 100 having an example tail cap 300 with the example actuator 350 of the first type 350H; FIGS. 4A and 4B are perspective and exploded views, respectively, of the example tail cap 300 having the example actuator 350 of the first type 350H; and FIGS. 5A and 5B are perspective and exploded views, respectively, of the example tail cap 300 having the example actuator 350 of the second type 350L. The following description applies to all of the embodiments, even though references may be made only to light 100 and the various elements thereof. It is noted that tail cap 300 (as well as tail cap 300') is typically an assembly, e.g., including inter alia a housing 310 and one or more actuators 350, and may be referred to as a tail cap 300 (300') or as a tail cap assembly 300 (300'), and those terms are considered equivalent and may be used interchangeably herein.

Tail cap 300 is illustrated in certain views as being removed from body housing 210 after fasteners 302 are removed, which exposes the exterior and internal structure of the tail cap. Actuators 350, 350H, 350L pivot about a pin, pivot pin or axle 314 that is disposed in coaxial pivot holes 312 through tail cap housing 310 and in transverse slot 312S that extends therebetween; pivot pin 314 also passes through pivot holes 358 at a first, or upper, end of actuators 350, 350H, 350L, whereby actuators 350, 350H, 350L are pivotable on pivot 314 towards and away from housing 310.

Tail cap cover 300 includes a tail cap housing 310 which has a relatively hard or rigid housing substrate 310H and a relatively soft resilient housing part 310R integral therewith, preferably, e.g., a soft resilient material 310R. Preferably, the soft resilient material 310R is over-molded onto the hard substrate 310H, and also preferably strongly and permanently bonds thereto. In a preferred embodiment, housing 310 advantageously serves plural functions, thereby significantly simplifying tail cap 300 while improving the serviceability thereof. Among those functions are, e.g., supporting actuators 350, retaining pivot pin 314 in transverse slot 312S, providing a seal in openings through tail cap housing 310, and/or providing a resilient member biasing and assisting in the operation of actuators 350.

In the illustrated preferred example embodiment, soft resilient housing part 310R is preferably a single part 310R, e.g., in the shape resembling an inverted "T", that extends into transverse slot 312S and that substantially fills openings 310H in the rear surface of housing 310. Part 310R extends into transverse slot 312S so as to be in frictional contact with pivot pin 314 thereby to retain pin 314 in slot 312S while remaining removable therefrom by action of a transverse force that overcomes the frictional retention force and/or the resiliency of material 310R.

Pin 314 may have a centrally located reduced diameter portion and/or slot 312S may have a centrally located reduced transverse dimension portion, e.g., of the resilient material 312R therein, to further enhance retention of pin 314 in slot 312S of cover housing 310 beyond that due solely to friction. The reduced diameter portion pin 314 and/or the reduced transverse dimension portion of slot 312S may be located at any respective corresponding locations of slot 312S and pin 314, however, a central location for both is preferred so that pin 314 may be inserted into slot 312S in either orientation.

The parts 310RH of resilient material 310R that fill the openings or holes 310H provide resilient seals for cover 310 that flex or deform when pressed inwardly by projection or nub 354 of an actuator 350 to press against and actuate an electrical switch 252 interior to light 100 for controlling the light produced thereby. When the inward pressing of actuator 350 is removed, resilient seal part 310RH tends to return to its unpressed shape thereby releasing pressure on the internal electrical switch 252 and moving actuator 350 away from the rear surface of housing 310. Thus resilient part 310R, e.g., part 310RS thereof, serves the additional function of acting as would a spring, but without the need for a separate spring.

Each actuator 350, 350H, 350L has an opening 358 through the upper end thereof through which pivot pin 314 passes for pivotably mounting actuator 350, 350H, 350L on tail cap housing 310, 310'. Each actuator 350, 350H, 350L also has an actuation feature 354 that extends outwardly from an underside thereof towards an opening 310H in tail cap housing 310, 310H and that is aligned with electrical switch 252 disposed interiorly to tail cap 300, 300' and housing 310, 310' thereof. Preferably, the actuation feature 354 is a projection or nub integrally formed with actuator 350, but may include, alternatively e.g., a rod or bumper 354 that is disposed in the underside of actuator 350, 350H, 350L to be adjacent to housing 310, 310' and that extends therefrom to abut seal 310RH at least when actuator 350, 350H, 350L is pressed to move inwardly towards housing 310, 310' and switch 252. When a bumper 354 is utilized, it may be of a resilient material so as to be deformable to reduce the likelihood that excessive pressure applied to actuator 350, 350H, 350L is coupled to electrical switch 252, however, soft resilient seal 310RH itself provides such deformability and may be molded with concentric corrugations.

Thus, the configuration of the preferred example arrangement reduces the number of parts needed for proper actuator operation of actuator 350, 350H, 350L and the like, by eliminating the need for, e.g., springs, pistons, separate seals, separate bumpers and the like. As a result, the simpler configuration achievable with the described arrangement tends to reduce cost and to increase reliability and serviceability.

The described arrangement is the same for actuators 350, 350H, 350L as well as for an actuator 350 having any other shape, e.g., of its actuation surface 352, so that the operation thereof is the same irrespective of the particular actuator 350, 350H, 350L employed. As a result, any of the possible different actuators 350, including, e.g., actuators 350H and 350L, as well as other configurations, are interchangeable one for another on any light 100, 100', cover 300, 300', and/or tail cap 300, 300'.

Where a pair of actuators 350, 350H, 350L are employed, the structure and arrangement of each actuator 350, 350H, 350L is usually and preferably the same, although a user may choose to mix actuators 350 of various configurations, if desired, because many different actuator configurations 350 can have the same interface with light body 210, 210' or cover housing 310, 310' (and other housings) as described. Actuators 350, 350H, 350L may have recesses therein, e.g., in the side thereof that is adjacent to the trigger guard of a firearm for reducing the amount of material required therefor, e.g., a plastic or other molding material, and/or the aesthetic appearance thereof.

Typically, actuators 350, 350, 350' comprise a set of interchangeable actuators (e.g., a set of pairs of interchangeable actuators where a light or device has a pair of actuators, as in the illustrated lights) wherein each actuator (and each pair thereof) has the same configuration of pivot opening 358 and actuating feature 354 for being interchangeably pivotably mountable on pivot pin 314 on housing 310, 310' and for actuating electrical switch 252 therein through seal 310RH, but has a different configuration (shape) of its actuator surface 352 for accommodating the preferences of different users. The set of actuators may be provided with the light, e.g., in the same package therewith, but may be provided as an accessary or option.

Figure 6A:
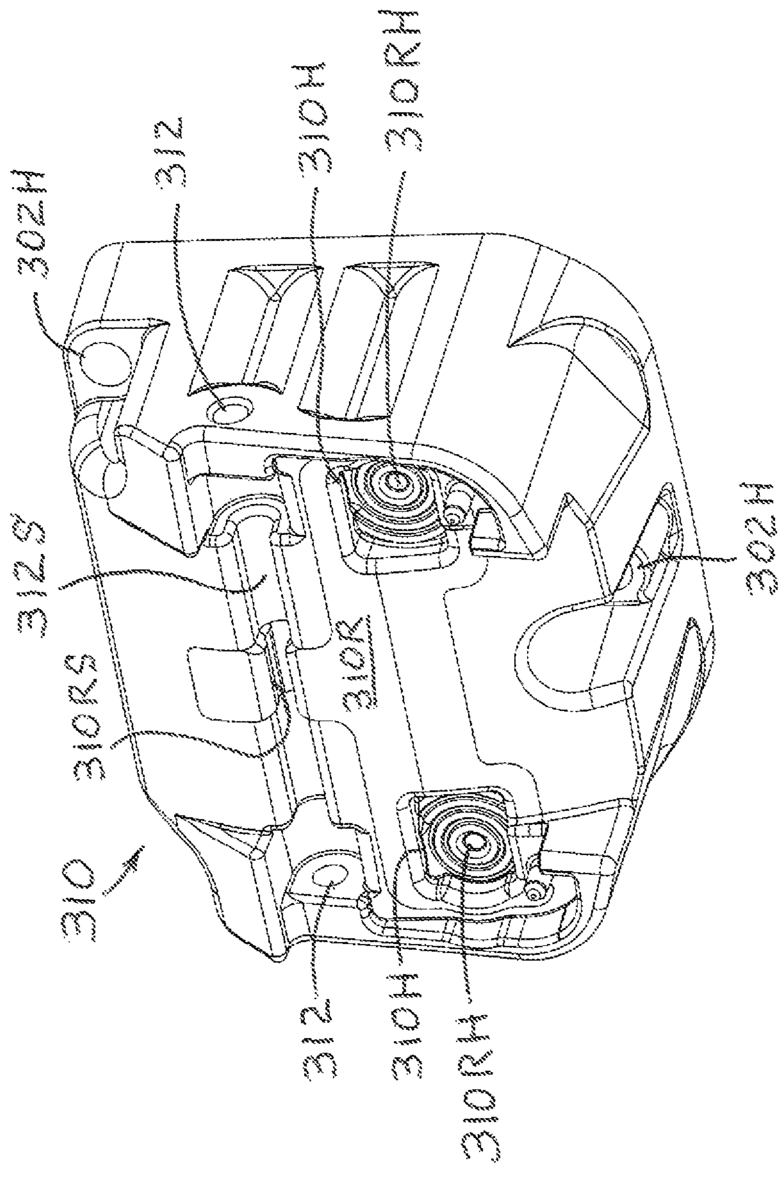
FIGS. 6A and 6B are perspective views showing the exterior and the interior, respectively, of an example housing for the example cover or tail cap.
Figure 6B:
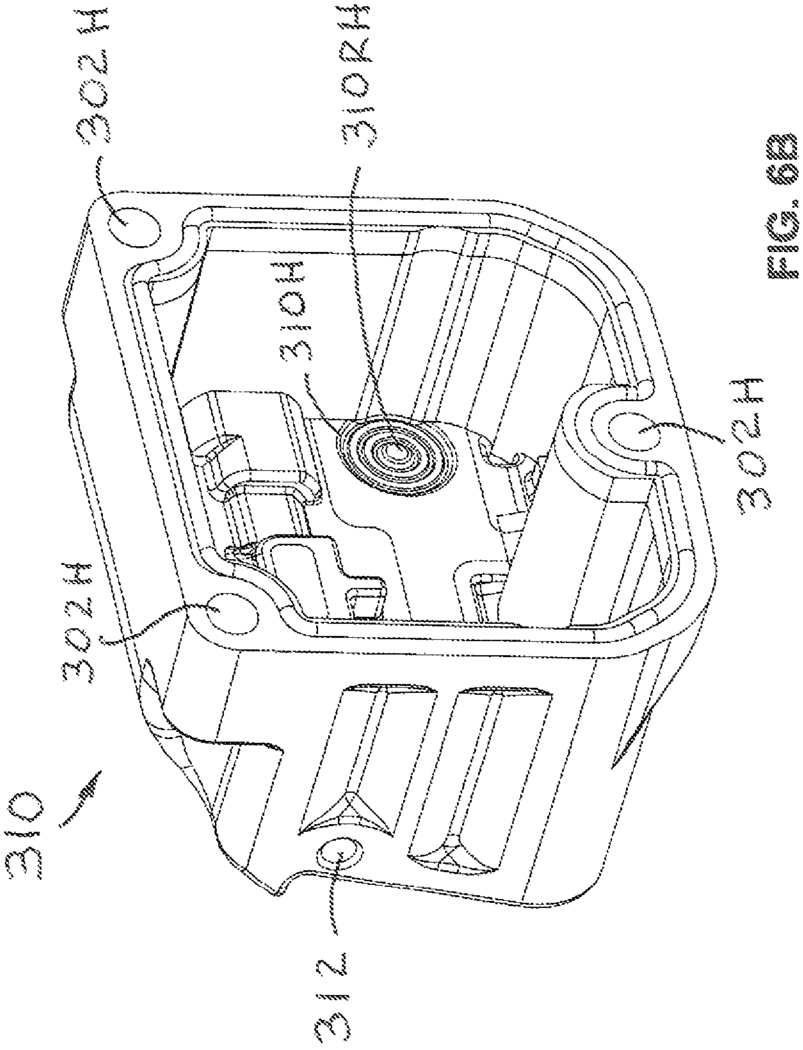
Figure 7:
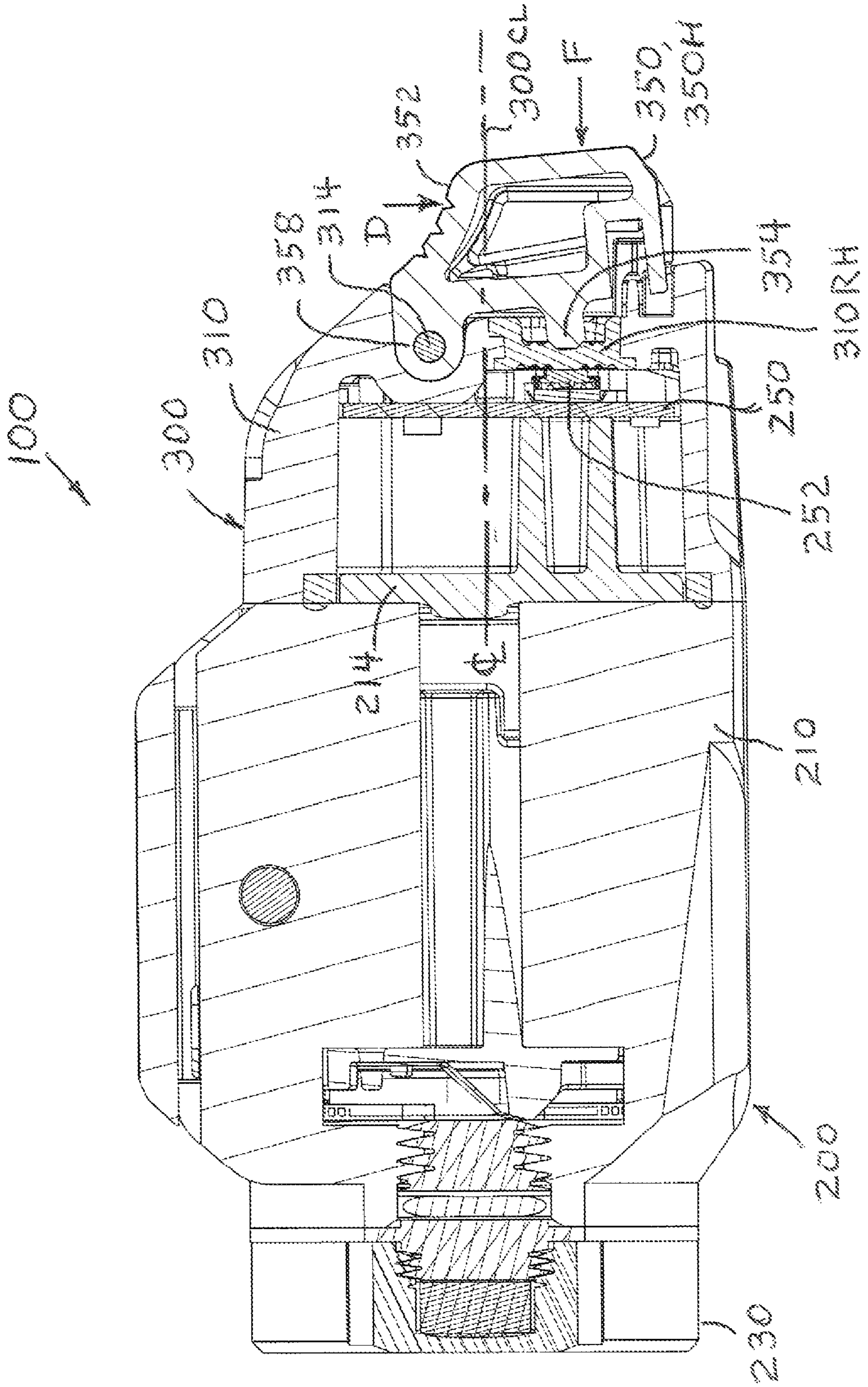
FIG. 7 is a cross-sectional view of the example light including the example cover or tail cap assembly having the actuator of the first type in un-actuated position.

FIGS. 6A and 6B are perspective views showing the exterior and the interior, respectively, of an example housing 310 for the example cover or tail cap 300; and FIG. 7 is a cross-sectional view of the example light 100 including the example cover or tail cap assembly 300 having the actuator 350, 350H of the first type in un-actuated position. The following description generally applies to all of the embodiments except as noted, and supplements the description relating to the preceding Figures, which should be referred to as necessary regarding the following description.

Soft resilient part 310R is shown in this example embodiment as being an inverted "T" like part wherein a retainer 310RS, e.g., a soft restriction 310RS, of the transverse dimension of transverse slot 312S is provided by the vertical or tail part of the "T" and the resilient seals 310RH in respective holes 310H of the cover or tail cap housing 310 are provided by the ends of the crosswise of top of the "T", whereby a single over-molded resilient material on tail cap housing 310, 310' serves to provide plural, e.g., three, different features that facilitate the described operation and interchangeability of various shapes and kinds of actuators 350.

The combination of materials for cover housing 310, 310' or tail cap housing 310, 310' and molded resilient insert 310R are preferably selected so that molded insert 310R is "molecularly bonded" or "chemically bonded" to housing 310, 310', thereby to from a permanent and rugged unified housing, including one or more permanent seals 310RH and a retainer 310RS. In addition, it is desirable that the material of which housing 310, 310' is formed be structurally strong while the material of which molded resilient member 310R is formed be softer, resilient and flexible to facilitate easy movement of pivot pin 314 in transverse slot 312S of housing 310, 310' for its being placed into or removed from slot 312S, e.g., for interchanging an actuator 350, 350H, 350L and the like.

In one example, a two-step injection molding process may be utilized to form a housing 310, 310' including to bond the soft resilient member 310R to the hard part of housing member 310, 310' of light 100, 100'. In a first molding step, the housing member 310, 310' is formed as one piece utilizing a mold having an internal core and an exterior mold that define the shape and features, such as the internal structure and features, thereof. Therein, e.g., a thermoplastic substrate material is injected through a primary runner system, as in a normal injection molding cycle, and the mold volume and passages of the second runner system to be utilized to inject the thermoplastic elastomer for the resilient member 310R are shut off from the primary runner system. After the housing member 310, 310' is allowed to cool, the external mold and the internal core are removed and the one piece hard part of housing member 310, 310' remains.

In that example, e.g., in the second molding step, an exterior mold defining the shape and features of housing member 310, 310' is closed and the second runner system is connected to the volume between the housing member 310, 310' and the exterior mold to be filled. Thermoplastic elastomer is injected into the mold over-forming the housing member 310, 310', e.g., directly forming resilient member 310R onto the housing member 310, 310'. After sufficient cooling of the resilient thermoplastic elastomer 310R, the exterior mold is removed, and the housing member 310, 310' with the resilient member 310R formed thereon is removed. This process enables the resilient member 310R, which is preferably formed of a material providing a retainer and one or more seals, to be integrally formed with housing member 310, 310'.

The combination of materials for the hard part of housing member 310, 310' and the soft resilient member 310R preferably allow for the molecular bonding of the resilient member 310R to housing member 310, 310', and preferably for a structurally strong and durable housing member 310, 310' for cover or tail cap 300, 300'. Preferably, both molding steps in forming housing member 310, 310' of cover or tail cap 300, 300' are performed sequentially on a two-step or two-shot molding machine.

For the purpose of discussion, tail cap 310 and light 100 each have a centerline and the centerline of each is represented approximately by centerline 300CL; in most instances both centerlines 300CL will be close to being the same line, but need not be, and so centerline 300CL herein represents either or both. In the example illustrations, centerline 300CL is substantially centered between the top of tail cap assembly 300 and the bottom thereof.

Each actuator 350, 350H, 350L has a pivot hole 358 near one end thereof, e.g., the end generally in an upper location when on light 100, 100', and has an actuator surface 352 on the surface thereof that is opposite to the surface adjacent to tail cap housing 310. Actuator surface 352 may be located at virtually any place along actuator 350 from slightly below pivot hole 358 to near to the bottom end of actuator 350. Actuator surface 352 of example actuator 350H is located high on actuator 350H and is relatively close to pivot hole 358, i.e. above centerline 300CL, while actuator surface 352 of actuator 350L is located low on actuator 350L and is relatively close to the bottom of tail cap housing 310, i.e. below centerline 300CL.

Each actuator 350, 350H, 350L has an actuating feature 354, e.g., a projection, nub or bumper 354, that extends from the surface thereof adjacent to tail cap housing 310 at a location below the centerline 300CL, i.e. on the opposite side of centerline 300CL from pivot hole 358. Thus actuating projection 354 is spaced away from pivot hole 358.

Actuating feature 354, e.g., projection, nub or bumper 354, is proximate soft resilient seal 310RH in opening or hole 310H which biases actuator 350, 350H, 350L away from tail cap housing 310 which allows projection 354 to move away from electrical switch 252 on circuit board 250, whereby switch 252 is not actuated.

Support structure 214 of body housing 210 extends rearwardly to support circuit board 250 that includes electronic circuitry for controlling light 100. Circuit board 250 has one or more electrical switches 252 thereon that are located in predetermined locations on circuit board 250 so that they are actuated when actuator 350, 350H, 350L is pressed, e.g., at actuator surface 352 or at certain other locations thereon, producing pivoting of actuator 350, 350H, 350L towards housing 310. Movement of actuator 350, 350H, 350L in a direction toward tail cap housing 310 is coupled via soft resilient seal 310RH that is disposed in hole 310H of tail cap housing 310 such that the surface of seal 310RH that is interior to housing 310 moves forwardly to actuate electrical switch 252.

When actuator 350, 350H, 350L is actuated by a force (pressure) applied thereto sufficient to overcome the bias of soft resilient seal 310RH, actuator 350, 350H, 350L moves toward tail cap housing 310 and switch 252 therein whereby actuating feature 354, e.g., projection 354, moves toward switch 252 which causes soft resilient seal 310RH to move toward and actuate switch 252. When the actuating force (pressure) on actuator 350, 350H, 350L is released, actuator 350, 350H, 350L, soft resilient seal 310RH resiliently moves outwardly and switch 252 returns to its un-actuated condition.

Actuating force (pressure) may be applied to various actuators 350 over a relatively wide range of directions (angles) relative to the centerline 300CL examples of which are shown by the example arrows D and F in FIG. 7. Actuating force may be applied in a downward direction as illustrated by arrow D, e.g., substantially transverse to centerline 300CL, and may be applied in a forward direction as illustrated by arrow F, e.g., substantially parallel to centerline 300CL. Thus, light 100, 100' may be actuated by pressure applied over a wide range of angles, e.g., typically over a range of angles exceeding 90°. This feature is advantageous because it allows light 100, 100' to accommodate a wider variety of user anatomies, finger movements and preferences.

Arrow F illustrates that generally forwardly directed actuating force may be applied at almost any location along the rearward surface of actuator 350, 350H, 350L. Actuating force may be applied at least in any direction including and between that illustrated by arrow D and that illustrated by arrow F, e.g., over a range of angles of at least about 90°. In practice, downward actuation force (arrow D) may be angled to be somewhat forward of actuating surface 352 so as to be in a direction that is closer to being parallel with the sloping rear surface of actuator 350, 350H, 350L, and forward actuation force (arrow F) may be angled so as to be in an upward direction that is not parallel with centerline 300CL, while remaining effective for causing actuator 350, 350H, 350L to actuate light 100, 100', e.g., at least over a range of angles in excess of 90°. The foregoing are advantageous because the allows light 100, 100' to be actuated by a wider variety of user anatomies and finger movements.

The foregoing is believed to result from the configuration of tail cap assembly 300, 300' wherein actuators 350, 350H, 350L have a pivot 358, 314 or hinge 358, 314 that is substantially above centerline 300CL and have an actuating feature 354 that is spaced apart from pivot 358, 314 and is substantially below centerline 300CL.

The housing 310 of tail cap 300 or cover 300 has one or more holes 302H through which fasteners 302 pass for attaching cover 300 to light housing 200. Typically, the shape of cover housing 310 at the end that is adjacent to light body 200 is the same as the shape of that end of the light housing 210 and has holes corresponding to holes in light housing 210 for receiving fasteners 302. The number and locations of holes 302H is relatively unimportant to the functionality of tail cap or cover 300 as described herein. For example, cover 300 has three holes 302H and three fasteners 302, e.g., two at corners thereof and one along a side thereof, while cover 300' has four holes 302H and four fasteners 302, e.g., at respective corners thereof.

Figure 8:
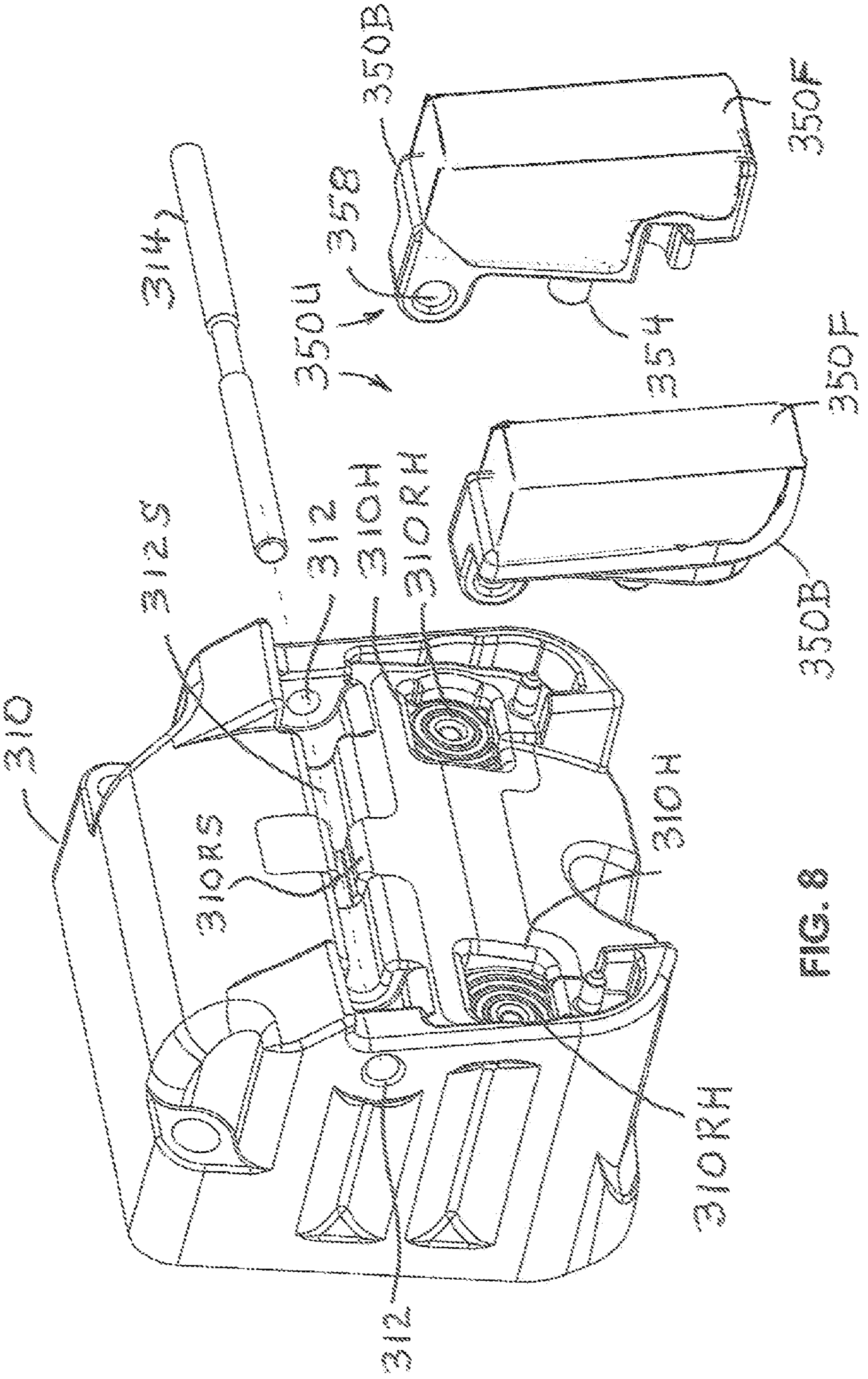
FIG. 8 is an exploded view of an example cover or tail cap having example user formable actuators and FIGS. 8A and 8B are perspective views of an example user formable actuator illustrating its method of making and use.
Figure 8B:
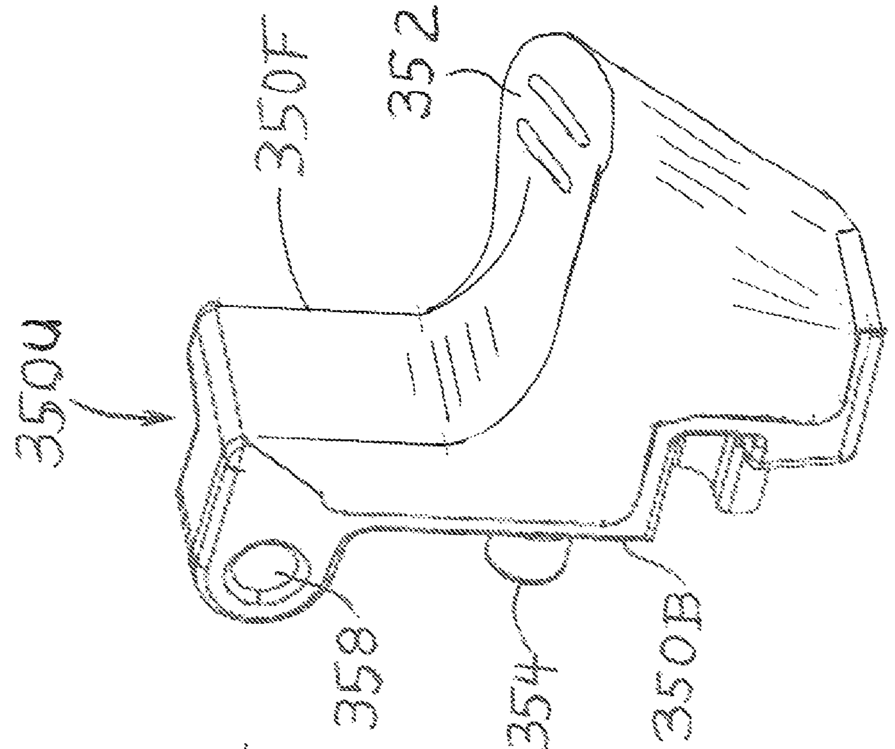
Figure 8A:
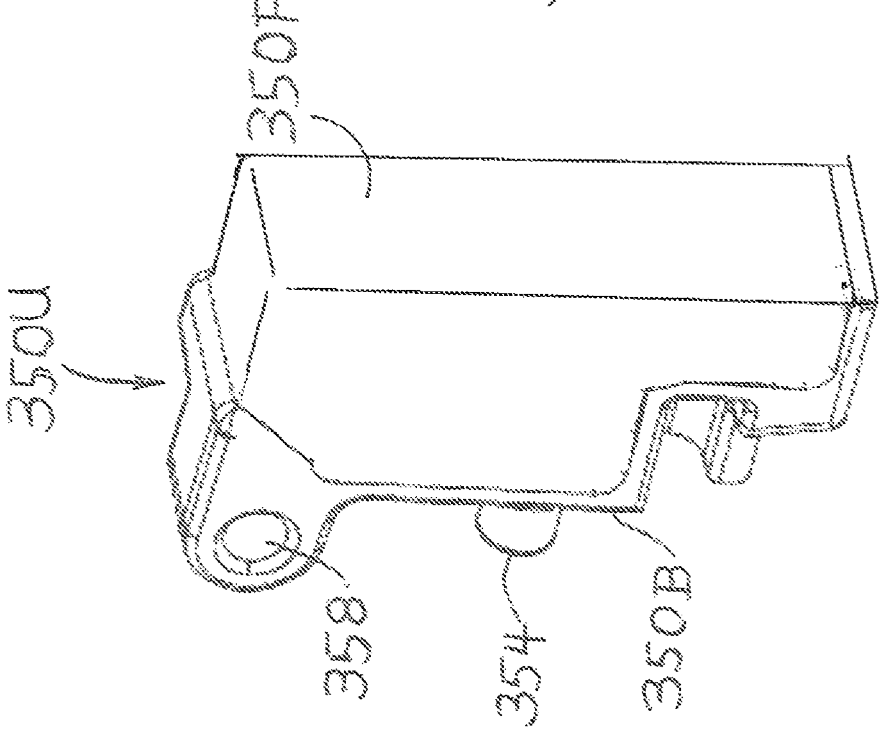

FIG. 8 is an exploded view of an example cover or tail cap 310 having example user formable actuators 350U, and FIGS. 8A and 8B are perspective views of an example user formable actuator 350U illustrating its method of making and use. A portable light 100 therefor may comprise a light body 200 having a cavity for a source of electrical power, a light head 230 at a forward end of the light body 200 including a light source for providing light. The light body includes a pair of electrical switches therein each for selectively energizing the light source 230 for producing light. In one example embodiment the light body 200 includes a tail cap 300 attached to an end of the light body and having a pair of openings 310H through which the pair of electrical switches can be actuated from outside of the light body.

A pair of actuators 350, 359U, typically in side-by-side spaced apart relationship to each other, are pivotably mounted 314 to the exterior surface of the tail cap 300, 310, wherein each actuator 350 has an actuation feature 354 that is spaced apart from the pivotable mounting 314 and extends towards a respective opening 310H of the tail cap 300, 310 for actuating the respective electrical switch when each actuator is pivoted towards the tail cap, i.e. towards the light body. The pivotable mounting 314 includes a pivot pin 314 on which the pair of actuators 350 are pivotable that is disposed in a receptacle 312S, e.g., a slot or groove 312S, in which the pivot pin is removable. A retainer 310RS of a resilient material is configured to resiliently retain the pivot pin 314 in the receptacle 312S of the tail cap 300, 310 and to resiliently deform for removal of the pivot pin 314 therefrom, whereby the actuators 350 are removable and replaceable on the light body by removing the pivot pin 314.

The tail cap 300, 310 preferably has a seal 310RH of the resilient material disposed in each of the respective openings 310H of the tail cap adjacent the respective actuation features 354 of the pair of actuators. In a preferred arrangement, the resilient material is over-molded on the tail cap housing 300, 310 to provide retainer 310RS and seals 310RH.

Example actuators 350 illustrated in FIGS. 8-8B are user formable actuators 350U that allow a user of the portable light 100 to configure the shape of actuator 350U according to the user's personal preferences of shape and size, thereby providing additional flexibility beyond that provided by the shapes and sizes of actuators 350 of predetermined configuration, e.g., the example actuators 350 having actuating surfaces 352 in predetermined locations, e.g., at high and low locations, as illustrated in previous Figures.

User defined actuator 350U, also referred to as user formable actuator 350U, includes, e.g., an actuator base member 350B of a rigid material defining an opening 358 for receiving the pivot pin 314 and defining the actuation feature 354, wherein the opening 358 and the actuation feature 354 are located on a first side of the actuator base member 350B, e.g., the side thereof that is adjacent the light body. A formable member 350F is disposed on a second side the actuator base member 350B, e.g., the side that is opposite to the first side thereof. The formable member 350F is of a formable material having a shape that can be formed to define an actuation surface 352 having a user defined shape 352U.

The formable material 350F may disposed onto base 350B by, e.g., molding, injection molding, over-molding, 3-D printing, adhesive, and the like. Base 350B may be provided with features, e.g., small posts with heads similar to a nail head, to improve adhesion of formable material 350F on base 350B. Formable materials 350F may be "two-stage" materials that include a solvent that is evaporated or otherwise removed after they are formed on base 350B to form a formable part of fixed, but formable, shape, from which they may be formed into a desired shape and then cured using, e.g., heat and/or UV light, to retain that shape.

The formable material of the formable member 350F is preferably curable on the actuator base member to retain the user defined shape, but may be adhesively or otherwise attached thereto. Examples of the formable material suitable for the user formable actuator 350U are curable by application of heat and/or by ultraviolet energy after the user as formed it into a desired shape. The formable material is formable using any suitable object, e.g., a tool, a metal tool, a plastic tool, a wooden tool, a spatula, a human finger, or a combination thereof. The set of actuators 350 described herein may include one or more user formable actuators 350U and/or one or more pairs of user formable actuators 350U, in addition to or in place of actuators 350 and/or pairs of actuators 350, such as actuators 350H, 350L, having predetermined shapes.

Formable actuator 350U may be, and preferably is, formed by the user and cured when it is not mounted to light 100, however, alternatively, it may be formed and cured while mounted on light 100, e.g., for a UV curable formable material 350F or for a heat curable formable material 350F whose curing temperature is within a specified temperature range of light 100, e.g., an operating temperature range or a storage temperature range.

The formable material for user formable actuators 350U may include, e.g., heat curable materials such as elastomers, silicone rubbers, and the like, and/or ultraviolet (UV) curable materials such as elastomers, silicone rubbers, and the like. The ESP7660-HK dielectric adhesive material, the UVF7050 optically clear, UV/heat-curable adhesive, the RTK7660-HK tacky low temperature curing adhesive and/or the UVF7050-PSA pressure sensitive adhesive available from AI Technology, Inc. of Princeton Junction, N.J. are believed to be suitable materials.

In a typical embodiment, various parts, e.g., housings 210, 210', 230, 310, 310', actuators 350, 350H, 350L, 350B and the like may be a nylon, reinforced nylon, engineered nylon, nylon 6, nylon 66, polyamide, polyamide 66, reinforced polyamide, reinforced polyamide 66, acrylonitrile butadiene styrene (ABS), polycarbonate, polyethylene, polypropylene, polycarbonate, polyester-polycarbonate blend, ABS polycarbonate blend, or other suitable plastic material, or of a cast, molded, forged, or machined metal. Resilient and/or flexible parts, such as, e.g., resilient member 310R, retainer 210RS, and seals 310RH, and in some examples actuating feature 354, may be of any suitable flexible and/or resilient material, e.g., rubber, neoprene rubber, elastomers, thermoplastic elastomers (TPEs), silicones, urethanes, MONOPRENE® rubber, nylon-bondable SANTOPRENE® rubber, HERCUPRENE rubber, NYLABOND® TPE over-molding material, AuroraFlex™ TPE over-molding material, and other suitable materials. For example, preferred rubber and elastomer over-molding materials should chemically bond to a molded base material, e.g., nylon 6, glass-reinforced nylon 6 and blends of nylon 6 and nylon 6/6, without requiring a primer that would complicate the molding process, e.g., a two-step molding process.

Metal parts, such as clips, clamping members, keys, fasteners, and springs may be of any suitable metal, e.g., aluminum, steel, spring steel, metal wires, brass, bronze, phosphor bronze, magnesium, beryllium copper, and the like. Where a part provides heat sinking, e.g., in light head 230 and/or light body 200, 200', such may include a relatively highly thermally conductive material such as aluminum, brass, copper, magnesium, cast metal, and/or a plastic filled with thermally conductive particles, e.g., a thermally conductive reinforced nylon, engineered nylon, acrylonitrile butadiene styrene (ABS), polycarbonate, polyethylene, polypropylene, polycarbonate, polyester-polycarbonate blend, ABS polycarbonate blend, or other suitable thermally conductive plastic material, e.g., a plastic that includes (is filled with) thermally conductive particles, flakes, strands or other thermally conductive material, as well as other materials having suitable strength and thermal conductivity.

A portable light may comprise: a light body having a cavity for a source of electrical power, a light head at a forward end of the light body including a light source for providing light, wherein the light body includes an electrical switch therein for selectively energizing the light source of the light head for producing light, and wherein the light body has an opening through which the electrical switch can be actuated from outside of the light body; at least one actuator for the portable light; a pivotable mounting for mounting the at least one actuator pivotably to the exterior surface of the light body, the at least one actuator having an actuation feature that is spaced apart from the pivotable mounting and that extends towards the opening of the light body for actuating the electrical switch when the at least one actuator is pivoted towards the light body; the pivotable mounting including a pivot pin on which the at least one actuator is pivotable; the light body having a receptacle in which the pivot pin is removably disposed; the light body further including a retainer of a resilient material configured to resiliently retain the pivot pin in the receptacle of the light body and to resiliently deform for removal of the pivot pin therefrom; whereby the at least one actuator is removable and replaceable on the light body by removing the pivot pin; and the light body having a seal of the resilient material disposed in the opening of the light body. The resilient material of the retainer may adhere to the light body; or the resilient material of the seal may adhere to the light body; or the resilient material of the retainer and of the seal may adhere to the light body. The resilient material may be molded onto the light body to provide the retainer; or resilient material may be molded onto the light body to provide the seal; or resilient material may be molded onto the light body to provide the retainer and to provide the seal; or resilient material may be over molded onto the light body by a second molding step of a two step molding process to provide both the retainer and the seal. The light body may include a body housing and a tail cap assembly; wherein: the light body includes the electrical switch therein and the tail cap assembly is attached to an end of the light body; and the tail cap assembly includes a tail cap housing that has the seal disposed in an opening thereof and has the at least one actuator pivotably mounted to an exterior surface thereof with the actuation feature of the at least one actuator adjacent the seal. The resilient material of the retainer adheres to the tail cap housing; or the resilient material of the seal adheres to the tail cap housing; or the resilient material of the retainer and of the seal adheres to the tail cap housing. The resilient material may be molded onto the tail cap housing to provide the retainer; or resilient material may be molded onto the tail cap housing to provide the seal; or resilient material may be molded onto the tail cap housing to provide the retainer and to provide the seal; or resilient material may be over molded onto the tail cap housing by a second molding step of a two step molding process to provide both the retainer and the seal. The light body defines a centerline and: wherein one end of the at least one actuator is pivotably mounted to the exterior surface of the tail cap housing at a location spaced away from the centerline in a first direction, wherein the at least one actuator extends beyond the center line in a direction opposite to the first direction and the actuation feature thereof is spaced apart from the pivotable mounting and extends towards the exterior surface of the tail cap housing for actuating the electrical switch when the at least one actuator is pivoted towards the exterior surface of the tail cap housing, whereby the centerline is between the pivotable mounting of the at least one actuator and the actuation feature thereof. The light body defines a centerline and: wherein one end of the at least one actuator is pivotably mounted to the exterior surface of the light body at a location spaced away from the centerline in a first direction, wherein the at least one actuator extends beyond the center line in a direction opposite to the first direction and the actuation feature thereof is spaced apart from the pivotable mounting and extends towards the exterior surface of the light body for actuating the electrical switch when the at least one actuator is pivoted towards the exterior surface of the light body, whereby the centerline is between the pivotable mounting of the at least one actuator and the actuation feature thereof. The at least one actuator may be one of a set of actuators, each actuator of the set thereof including an actuation surface on a longer side thereof, wherein each actuator of the set thereof has the actuation surface thereof located on the actuator at a location along the longer side of the actuator away from the centerline in a first direction and each actuator of the set thereof has the actuation surface thereof located on the actuator at a location along the longer side of the actuator away from the centerline in a direction opposite to the first direction. The light body may define a centerline, wherein: the at least one actuator includes a pair of actuators, and a first actuator of the pair of actuators is pivotably mounted to the exterior surface of the light body at a location spaced away from the centerline in a first direction, and a second actuator of the pair of actuators is pivotably mounted to the exterior surface of the light body at a location spaced away from the centerline in a direction opposite to the first direction, whereby the first and second actuators are spaced apart on the light body. The at least one actuator may be one of a set of actuators, each actuator of the set thereof having an opening for receiving the pivot pin and having an actuation feature located in the same respective locations relative to every other actuator of the set thereof, each actuator of the set thereof including an actuation surface on a longer side thereof, wherein the actuation surfaces of different actuators of the set thereof are located different locations along the longer side of the different actuators. The at least one actuator may be one of a set of actuators, each actuator of the set thereof having an opening for receiving the pivot pin and an actuation feature located in the same respective locations relative to every other actuator of the set thereof, each actuator of the set thereof including an actuation surface on a longer side thereof, wherein the actuation surfaces of different actuators of the set thereof are located at different locations along the longer side of the different actuators. The light body may define a centerline, wherein the light body includes a clamping arrangement for attaching the portable light to an object, wherein the pivotable mounting of the at least one actuator is disposed between the centerline and the clamping arrangement. The object may be a firearm. The at least one actuator of the tail cap assembly may include a pair of actuators located near opposite ends of the exterior surface of the tail cap housing and wherein the pair of actuators are spaced apart for receiving a part of a firearm therebetween when the portable light is mounted to the firearm by the clamping arrangement. The actuation feature of the at least one actuator may include a bumper extending therefrom to couple movement of the at least one actuator to the electrical switch when the at least one actuator is pivoted toward the exterior surface of the tail cap housing. The actuator may have an actuation surface extending from a longer side thereof that is not adjacent to the exterior surface, wherein the actuation surface is located on the actuator at a center line of the light body or at a location away from the centerline in either direction along the longer side of the at least one actuator. The actuation surface of the at least one actuator may have a plurality of ridges thereon. The at least one actuator may provide an ON/OFF function and a mode selection for the light source. The at least one actuator may include a user formable actuator which may comprise: an actuator base member of a rigid material defining an opening for receiving the pivot pin and defining the actuation feature, wherein the opening and the actuation feature are located on a first side of the actuator base member adjacent the light body; and a formable member disposed on a second side the actuator base member that is opposite to the first side thereof, the formable member being of a formable material having a shape that can be formed to define an actuation surface having a user defined shape; and wherein the formable material of the formable member is curable on the actuator base member to retain the user defined shape. The formable material of the user formable actuator may be curable by heat and/or by ultraviolet energy. The portable light: wherein the formable material of the user formable actuator is curable by heat and/or by ultraviolet energy when the user formable actuator is apart from the portable light, or wherein the formable material of the user formable actuator is curable by heat within the portable light's specified temperature range and/or by ultraviolet energy when the user formable actuator is mounted on the portable light. The formable material of the user formable actuator may be formable using: a tool, a metal tool, a plastic tool, a wooden tool, a spatula, a human finger, or a combination thereof. The set of actuators may include a user formable actuator, and the user formable actuator may comprise: an actuator base member of a rigid material defining the opening for receiving the pivot pin and defining the actuation feature, wherein the opening and the actuation feature are located on a first side of the actuator base member adjacent the light body; and a formable member disposed on a second side the actuator base member that is opposite to the first side thereof, the formable member being of a formable material having a shape that can be formed to define an actuation surface having a user defined shape; and wherein the formable material of the formable member is curable on the actuator base member to retain the user defined shape. The portable light: wherein the formable material of the user formable actuator is curable by heat and/or by ultraviolet energy when the user formable actuator is apart from the portable light, or wherein the formable material of the user formable actuator is curable by heat within the portable light's specified temperature range and/or by ultraviolet energy when the user formable actuator is mounted on the portable light.

A portable light may comprise: a light body having a cavity for a source of electrical power, a light head at a forward end of the light body including a light source for providing light, wherein the light body includes a pair of electrical switches therein each for selectively energizing the light source of the light head for producing light, and wherein the light body includes a tail cap attached to an end of the light body and having a pair of openings through which the pair of electrical switches can be actuated from outside of the light body; a pair of actuators for the portable light; a pivotable mounting for mounting the pair of actuators pivotably to the exterior surface of the tail cap of the light body, the pair of actuators being side by side and spaced apart from each other, wherein each actuator has an actuation feature that is spaced apart from the pivotable mounting and that extends towards a respective opening of the tail cap for actuating the respective electrical switch when each actuator is pivoted towards the tail cap of the light body; the pivotable mounting including a pivot pin on which the pair of actuators are pivotable; the tail cap having a receptacle in which the pivot pin is removably disposed; the tail cap further including a retainer of a resilient material configured to resiliently retain the pivot pin in the receptacle of the tail cap and to resiliently deform for removal of the pivot pin therefrom; whereby the actuators are removable and replaceable on the light body by removing the pivot pin; and the tail cap having a seal of the resilient material disposed in the respective openings of the tail cap adjacent the respective actuation features of the pair of actuators. The user formable actuator: wherein the formable material is cured by heat and/or by ultraviolet energy when the user formable actuator is apart from the portable light, or wherein the formable material is cured by heat within the portable light's specified temperature range and/or by ultraviolet energy when the user formable actuator is on the portable light.

A user formable actuator for a light may comprise: an actuator base member of a rigid material defining an opening for receiving a pivot pin and defining an actuation feature, wherein the opening and the actuation feature are located on a first side of the actuator base member configured to be adjacent to a light body; and a formable member disposed on a second side the actuator base member that is opposite to the first side thereof, the formable member being of a formable material having a shape that can be formed to define an actuation surface having a user defined shape; and wherein the formable material of the formable member is curable on the actuator base member to retain the user defined shape. The formable material may be curable by heat and/or by ultraviolet energy. The user formable actuator of claim 27: wherein the formable material is curable by heat and/or by ultraviolet energy when the user formable actuator is apart from the light, or wherein the formable material is curable by heat within the light's specified temperature range and/or by ultraviolet energy when the user formable actuator is mounted on the light. The formable material may be formable using: a tool, a metal tool, a plastic tool, a wooden tool, a spatula, a human finger, or a combination thereof. The user formable actuator may be in combination with a set of actuators, each actuator of the set thereof having an opening for receiving the pivot pin and having an actuation feature located in the same respective locations relative to every other actuator of the set thereof including the user formable actuator, each actuator of the set thereof other than the user formable actuator having an actuation surface on a longer side thereof, wherein the actuation surfaces of different actuators of the set thereof other than the user formable actuator are located at different locations along the longer side of the different actuators. The user formable actuator may be in combination with: a light body having a cavity for a source of electrical power, a light head at a forward end of the light body including a light source for providing light, wherein the light body includes an electrical switch therein for selectively energizing the light source of the light head for producing light, and wherein the light body has an opening through which the electrical switch can be actuated from outside of the light body; a pivotable mounting for mounting the user formable actuator pivotably to the exterior surface of the light body with the actuation feature of the user formable actuator extending towards the opening of the light body for actuating the electrical switch when the user formable actuator is pivoted towards the light body; the pivotable mounting including a pivot pin on which the user formable actuator is pivotable; the light body having a receptacle in which the pivot pin is removably disposed; the light body further including a retainer of a resilient material configured to resiliently retain the pivot pin in the receptacle of the light body and to resiliently deform for removal of the pivot pin therefrom; whereby the user formable actuator is removable and replaceable on the light body by removing the pivot pin. The user formable actuator: wherein the formable material is curable by heat and/or by ultraviolet energy when the user formable actuator is apart from the light body, or wherein the formable material is curable by heat within the light's specified temperature range and/or by ultraviolet energy when the user formable actuator is mounted on the light body.

As used herein, the term "about" means that dimensions, sizes, formulations, parameters, shapes and other quantities and characteristics are not and need not be exact, but may be approximate and/or larger or smaller, as desired, reflecting tolerances, conversion factors, rounding off, measurement error and the like, and other factors known to those of skill in the art. In general, a dimension, size, formulation, parameter, shape or other quantity or characteristic is "about" or "approximate" whether or not expressly stated to be such. It is noted that embodiments of very different sizes, shapes and dimensions may employ the described arrangements.

Although terms such as "front," "back," "rear," "side," "end," "top," "bottom," "up," "down," "left," "right," "upward," "downward," "forward," "backward," "under" and/or "over," "vertical," "horizontal," and the like may be used herein as a convenience in describing one or more embodiments and/or uses of the present arrangement, the articles described may be positioned in any desired orientation and/or may be utilized in any desired position and/or orientation. Such terms of position and/or orientation should be understood as being for convenience only, and not as limiting of the invention as claimed.

As used herein, the term "and/or" encompasses both the conjunctive and the disjunctive cases, so that a phrase in the form "A and/or B" encompasses "A" or "B" or "A and B." Likewise, a phrase in the form "A, B and/or C" or a phrase in the form "A and/or B and/or C" includes "A," "B," "C," "A and B," "A and C," "B and C," and "A and B and C." In addition, the term "at least one of" one or more elements is intended to include one of any one of the elements, more than one of any of the elements, and two or more of the elements up to and including all of the elements, and so, e.g., phrases in the form "at least one of A, B and C" include "A," "B," "C," "A and B," "A and C," "B and C," and "A and B and C."

As used herein, the term "predetermined" means determined in advance or before hand with respect to whatever the term pertains to. The term may be used with respect to a physical object or thing and/or with respect to an intangible thing, e.g., a signal or data, and the like. Examples thereof may include a fixed value, position, condition and/or limit, however, predetermined is not limited to a fixed value, position, condition and/or limit. A predetermined value, position, condition and/or limit may change or otherwise vary over time, over a sequence and/or over a randomized series of values, positions, conditions and/or limits.

As used herein, the terms "substantial" and "substantially" mean that the thing referred to as being "substantial" or "substantially" is sufficiently similar in form and/or function as to function in the invention in a manner that is encompassed by the description and/or claims herein or an equivalent thereof.

As used herein, the term "plurality" means plural, two or greater in number of whatever the term pertains to, i.e. more than one. The term may be used with respect to a physical object or thing and/or with respect to an intangible thing, e.g., a signal or data, and the like. Examples thereof may include a fixed or movable thing, a fixed value, a changeable value, position, condition and/or limit, and the like.

A fastener as used herein may include any fastener or other fastening device that may be suitable for the described use, including threaded fasteners, e.g., bolts, screws and driven fasteners, as well as pins, rivets, nails, spikes, barbed fasteners, clips, clamps, nuts, speed nuts, cap nuts, acorn nuts, and the like. Where it is apparent that a fastener would be removable in the usual use of the example embodiment described herein, then removable fasteners would be preferred in such instances. A fastener may also include, where appropriate, other forms of fastening such as a formed head, e.g., a peened or heat formed head, a weld, e.g., a heat weld or ultrasonic weld, a braze, and adhesive, and the like.

The term battery is used herein to refer to an electro-chemical device comprising one or more electro-chemical cells and/or fuel cells, and so a battery may include a single cell or plural cells, whether as individual units or as a packaged unit. A battery is one example of a type of an electrical power source suitable for a portable or other device. Such devices could include power sources including, but not limited to, fuel cells, super capacitors, solar cells, and the like. Any of the foregoing may be intended for a single use or for being rechargeable or for both, and/or plural ones thereof may be combined into a battery pack or battery assembly.

While the present invention has been described in terms of the foregoing example embodiments, variations within the scope and spirit of the present invention as defined by the claims following will be apparent to those skilled in the art. For example, various actuators 350 may have any desired shape and are not limited to the illustrated HI and LO example embodiments 350H, 350L. Further, the length thereof may be, e.g., longer than illustrated so the end of actuator 350 distal from the pivot may extend below the bottom of light 100, 100' or may be curved so as to extend away from light body 200, 200' to be closer to a user's fingers.

Different actuators 350, 350H, 350L are interchangeable on different units of light 100, 100' and on other lights, and different actuators 350, 350H, 350L are interchangeable on different units of light 100', e.g., by removing one type of actuators 350, 350H, 350L and replacing it or them with another type of actuators 350, 350H, 350L.

Replacement of an actuator 350, 350H, 350L includes removing the pivot pin 314 to release actuator 350, 350H, 350L that is presently on the light 100, 100' thereby releasing that actuator 350, 350H, 350L, and then replacing the pivot pin 314 so that it engages both the light 100, 100' and the replacement actuator 350, 350H, 350L such that actuator 350, 350H, 350L is retained on light 100, 100' in an operable position pivotable on pivot pin 314.

While two different example light embodiments 100, 100' are illustrated herein, the present arrangement for interchangeable actuators may be employed with light bodies and/or tail caps or covers of a wide variety of very different lights. For example, the arrangement for interchanging actuators 350, 350H, 350L may be employed with light bodies that do not have a tail cap or cover that can be separated from the remainder of its light body, and can be employed on devices other than lights, whereby providing a replaceable actuator 350, 350H, 350L does not constrain the design of such lights or other devices to have a removable body part.

Where light 100, 100' has more than one actuator 350, 350H, 350L, each actuator 350, 350H, 350L may be retained on light 100, 100' by and be pivotable on the same pivot pin 314 or each actuator 350, 350H, 350L may be retained on light 100, 100' by a separate pivot pin 314.

While certain features may be described as a raised feature, e.g., a ridge, boss, flange, projection, detent, or other raised feature, such feature may be positively formed or may be what remains after a recessed feature, e.g., a groove, slot, hole, indentation, recess, detent, or other recessed feature, is made. Similarly, while certain features may be described as a recessed feature, e.g., a groove, slot, hole, indentation, recess or other recessed feature, such feature may be positively formed or may be what remains after a raised feature, e.g., a ridge, boss, flange, projection or other raised feature, is made. In addition, where a raised feature engages a recessed feature, such as a cylindrical projection that engages a complementary receptacle, the relative positions of the raised and recessed features may be interchanged or other wise modified.

Each of the U.S. Provisional Applications, U.S. Patent Applications, and/or U.S. Patents, identified herein is hereby incorporated herein by reference in its entirety, for any purpose and for all purposes irrespective of how it may be referred to or described herein.

Finally, numerical values stated are typical or example values, are not limiting values, and do not preclude substantially larger and/or substantially smaller values. Values in any given embodiment may be substantially larger and/or may be substantially smaller than the example or typical values stated.

What is claimed is:

1. A portable light comprising:

a light body having a cavity for a source of electrical power, a light head at a forward end of the light body including a light source for providing light, wherein the light body includes an electrical switch therein for selectively energizing the light source of the light head for producing light, and wherein the light body has an opening through which the electrical switch can be actuated from outside of the light body;

at least one actuator for the portable light;

a pivotable mounting for mounting the at least one actuator pivotably to the exterior surface of the light body, the at least one actuator having an actuation feature that is spaced apart from the pivotable mounting and that extends towards the opening of the light body for actuating the electrical switch when the at least one actuator is pivoted towards the light body;

the pivotable mounting including a pivot pin on which the at least one actuator is pivotable;

the light body having a receptacle in which the pivot pin is removably disposed;

the light body further including a retainer of a resilient material configured to resiliently retain the pivot pin in the receptacle of the light body and to resiliently deform for removal of the pivot pin therefrom;

whereby the at least one actuator is removable and replaceable on the light body by removing the pivot pin; and the light body having a seal of the resilient material disposed in the opening of the light body.

2. The portable light of claim 1 wherein:

the resilient material of the retainer adheres to the light body; or the resilient material of the seal adheres to the light body; or the resilient material of the retainer and of the seal adheres to the light body.

3. The portable light of claim 1 wherein:

resilient material is molded onto the light body to provide the retainer; or resilient material is molded onto the light body to provide the seal; or resilient material is molded onto the light body to provide the retainer and to provide the seal; or resilient material is over molded onto the light body by a second molding step of a two step molding process to provide both the retainer and the seal.

4. The portable light of claim 1 wherein the light body includes a body housing and a tail cap assembly; wherein:

the light body includes the electrical switch therein and the tail cap assembly is attached to an end of the light body; and the tail cap assembly includes a tail cap housing that has the seal disposed in an opening thereof and has the at least one actuator pivotably mounted to an exterior surface thereof with the actuation feature of the at least one actuator adjacent the seal.

5. The portable light of claim 4 wherein:

the resilient material of the retainer adheres to the tail cap housing; or the resilient material of the seal adheres to the tail cap housing; or the resilient material of the retainer and of the seal adheres to the tail cap housing.

6. The portable light of claim 4 wherein:

resilient material is molded onto the tail cap housing to provide the retainer; or resilient material is molded onto the tail cap housing to provide the seal; or resilient material is molded onto the tail cap housing to provide the retainer and to provide the seal; or resilient material is over molded onto the tail cap housing by a second molding step of a two step molding process to provide both the retainer and the seal.

7. The portable light of claim 4 wherein the light body defines a centerline and:

wherein one end of the at least one actuator is pivotably mounted to the exterior surface of the tail cap housing at a location spaced away from the centerline in a first direction, wherein the at least one actuator extends beyond the center line in a direction opposite to the first direction and the actuation feature thereof is spaced apart from the pivotable mounting and extends towards the exterior surface of the tail cap housing for actuating the electrical switch when the at least one actuator is pivoted towards the exterior surface of the tail cap housing, whereby the centerline is between the pivotable mounting of the at least one actuator and the actuation feature thereof.

8. The portable light of claim 1 wherein the light body defines a centerline and:

wherein one end of the at least one actuator is pivotably mounted to the exterior surface of the light body at a location spaced away from the centerline in a first direction, wherein the at least one actuator extends beyond the center line in a direction opposite to the first direction and the actuation feature thereof is spaced apart from the pivotable mounting and extends towards the exterior surface of the light body for actuating the electrical switch when the at least one actuator is pivoted towards the exterior surface of the light body, whereby the centerline is between the pivotable mounting of the at least one actuator and the actuation feature thereof.

9. The portable light of claim 8 wherein the at least one actuator is one of a set of actuators, each actuator of the set thereof including an actuation surface on a longer side thereof, wherein each actuator of the set thereof has the actuation surface thereof located on the actuator at a location along the longer side of the actuator away from the centerline in a first direction and each actuator of the set thereof has the actuation surface thereof located on the actuator at a location along the longer side of the actuator away from the centerline in a direction opposite to the first direction.

10. The portable light of claim 1 wherein the light body defines a centerline, wherein:

the at least one actuator includes a pair of actuators, and a first actuator of the pair of actuators is pivotably mounted to the exterior surface of the light body at a location spaced away from the centerline in a first direction, and a second actuator of the pair of actuators is pivotably mounted to the exterior surface of the light body at a location spaced away from the centerline in a direction opposite to the first direction, whereby the first and second actuators are spaced apart on the light body.

11. The portable light of claim 1 wherein the at least one actuator is one of a set of actuators, each actuator of the set thereof having an opening for receiving the pivot pin and having an actuation feature located in the same respective locations relative to every other actuator of the set thereof, each actuator of the set thereof including an actuation surface on a longer side thereof, wherein the actuation surfaces of different actuators of the set thereof are located different locations along the longer side of the different actuators.

12. The portable light of claim 1 wherein the at least one actuator is one of a set of actuators, each actuator of the set thereof having an opening for receiving the pivot pin and an actuation feature located in the same respective locations relative to every other actuator of the set thereof, each actuator of the set thereof including an actuation surface on a longer side thereof, wherein the actuation surfaces of different actuators of the set thereof are located at different locations along the longer side of the different actuators.

13. The portable light of claim 1 wherein the light body defines a centerline, wherein the light body includes a clamping arrangement for attaching the portable light to an object, wherein the pivotable mounting of the at least one actuator is disposed between the centerline and the clamping arrangement.

14. The portable light of claim 13 wherein the object is a firearm.

15. The portable light of claim 13 wherein the light body includes a body housing and a tail cap assembly having a tail cap housing, wherein the at least one actuator includes a pair of actuators located near opposite ends of the exterior surface of the tail cap housing and wherein the pair of actuators are spaced apart for receiving a part of a firearm therebetween when the portable light is mounted to the firearm by the clamping arrangement.

16. The portable light of claim 1 wherein the actuation feature of the at least one actuator includes a bumper extending therefrom to couple movement of the at least one actuator to the electrical switch when the at least one actuator is pivoted toward the exterior surface of the light body.

17. The portable light of claim 1 wherein the actuator has an actuation surface extending from a longer side thereof that is not adjacent to the exterior surface, wherein the actuation surface is located on the actuator at a center line of the light body or at a location away from the centerline in either direction along the longer side of the at least one actuator.

18. The portable light of claim 1 wherein the actuation surface of the at least one actuator has a plurality of ridges thereon.

19. The portable light of claim 1 wherein the at least one actuator provides an ON/OFF function and a mode selection for the light source.

20. The portable light of claim 1 wherein the at least one actuator includes a user formable actuator comprising:

an actuator base member of a rigid material defining an opening for receiving the pivot pin and defining the actuation feature, wherein the opening and the actuation feature are located on a first side of the actuator base member adjacent the light body; and a formable member disposed on a second side the actuator base member that is opposite to the first side thereof, the formable member being of a formable material having a shape that can be formed to define an actuation surface having a user defined shape; and wherein the formable material of the formable member is curable on the actuator base member to retain the user defined shape.

21. The portable light of claim 20 wherein the formable material of the user formable actuator is curable by heat and/or by ultraviolet energy.

22. The portable light of claim 20:

wherein the formable material of the user formable actuator is curable by heat and/or by ultraviolet energy when the user formable actuator is apart from the portable light, or wherein the formable material of the user formable actuator is curable by heat within the portable light's specified temperature range and/or by ultraviolet energy when the user formable actuator is mounted on the portable light.

23. The portable light of claim 20 wherein the formable material of the user formable actuator is formable using:

a tool, a metal tool, a plastic tool, a wooden tool, a spatula, a human finger, or a combination thereof.

24. The portable light of claim 12 wherein the set of actuators includes a user formable actuator, user formable actuator comprising:

an actuator base member of a rigid material defining the opening for receiving the pivot pin and defining the actuation feature, wherein the opening and the actuation feature are located on a first side of the actuator base member adjacent the light body; and a formable member disposed on a second side the actuator base member that is opposite to the first side thereof, the formable member being of a formable material having a shape that can be formed to define an actuation surface having a user defined shape; and wherein the formable material of the formable member is curable on the actuator base member to retain the user defined shape.

25. The portable light of claim 24:

wherein the formable material of the user formable actuator is curable by heat and/or by ultraviolet energy when the user formable actuator is apart from the portable light, or wherein the formable material of the user formable actuator is curable by heat within the portable light's specified temperature range and/or by ultraviolet energy when the user formable actuator is mounted on the portable light.

26. A portable light comprising:

a light body having a cavity for a source of electrical power, a light head at a forward end of the light body including a light source for providing light, wherein the light body includes a pair of electrical switches therein each for selectively energizing the light source of the light head for producing light, and wherein the light body includes a tail cap attached to an end of the light body and having a pair of openings through which the pair of electrical switches can be actuated from outside of the light body;

a pair of actuators for the portable light;

a pivotable mounting for mounting the pair of actuators pivotably to the exterior surface of the tail cap of the light body, the pair of actuators being side by side and spaced apart from each other, wherein each actuator has an actuation feature that is spaced apart from the pivotable mounting and that extends towards a respective opening of the tail cap for actuating the respective electrical switch when each actuator is pivoted towards the tail cap of the light body;

the pivotable mounting including a pivot pin on which the pair of actuators are pivotable;

the tail cap having a receptacle in which the pivot pin is removably disposed;

the tail cap further including a retainer of a resilient material configured to resiliently retain the pivot pin in the receptacle of the tail cap and to resiliently deform for removal of the pivot pin therefrom;

whereby the actuators are removable and replaceable on the light body by removing the pivot pin; and the tail cap having a seal of the resilient material disposed in the respective openings of the tail cap adjacent the respective actuation features of the pair of actuators.

27. A user formable actuator for a light comprising:

an actuator base member of a rigid material defining an opening for receiving a pivot pin and defining an actuation feature, wherein the opening and the actuation feature are located on a first side of the actuator base member configured to be placed adjacent the light; and a formable member disposed on a second side of the actuator base member that is opposite to the first side thereof, the formable member being of a formable material having a shape that can be formed to define an actuation surface having a user defined shape; and wherein the formable material of the formable member is curable on the actuator base member to retain the user defined shape.

28. The user formable actuator of claim 27 wherein the formable material is curable by heat and/or by ultraviolet energy.

29. The user formable actuator of claim 27:

wherein the formable material is curable by heat and/or by ultraviolet energy when the user formable actuator is apart from the light, or wherein the formable material is curable by heat within the light's specified temperature range and/or by ultraviolet energy when the user formable actuator is mounted on the light.

30. The user formable actuator of claim 27 wherein the formable material is formable using:

a tool, a metal tool, a plastic tool, a wooden tool, a spatula, a human finger, or a combination thereof.

31. The user formable actuator of claim 27 in combination with a set of actuators, each actuator of the set thereof having an opening for receiving the pivot pin and actuation feature located in the same respective locations relative to every other actuator of the set thereof including the user formable actuator, each actuator of the set thereof other than the user formable actuator having an actuation surface on a longer side thereof, wherein the actuation surfaces of different actuators of the set thereof other than the user formable actuator are located at different locations along the longer side of the different actuators.

32. The user formable actuator of claim 27 in combination with:

a light body having a cavity for a source of electrical power, a light head at a forward end of the light body including a light source for providing light, wherein the light body includes an electrical switch therein for selectively energizing the light source of the light head for producing light, and wherein the light body has an opening through which the electrical switch can be actuated from outside of the light body;

a pivotable mounting for mounting the user formable actuator pivotably to the exterior surface of the light body with the actuation feature of the user formable actuator extending towards the opening of the light body for actuating the electrical switch when the user formable actuator is pivoted towards the light body;

the pivotable mounting including a pivot pin on which the user formable actuator is pivotable;

the light body having a receptacle in which the pivot pin is removably disposed;

the light body further including a retainer of a resilient material configured to resiliently retain the pivot pin in the receptacle of the light body and to resiliently deform for removal of the pivot pin therefrom;

whereby the user formable actuator is removable and replaceable on the light body by removing the pivot pin.

33. The user formable actuator of claim 32:

wherein the formable material is curable by heat and/or by ultraviolet energy when the user formable actuator is apart from the light body, or wherein the formable material is curable by heat within the light's specified temperature range and/or by ultra-violet energy when the user formable actuator is mounted on the light body.

* * * * *